US012056115B2

(12) United States Patent
Unagami et al.

(10) Patent No.: US 12,056,115 B2
(45) Date of Patent: Aug. 6, 2024

(54) CONTROL METHOD, SERVER, AND DATA STRUCTURE

(71) Applicant: Panasonic Intellectual Property Corporation of America, Torrance, CA (US)

(72) Inventors: Yuji Unagami, Osaka (JP); Junji Michiyama, Fukuoka (JP); Junichiro Soeda, Nara (JP); Yuuki Hirose, Osaka (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/377,085

(22) Filed: Oct. 5, 2023

(65) Prior Publication Data

US 2024/0037093 A1    Feb. 1, 2024

Related U.S. Application Data

(63) Continuation of application No. 17/497,302, filed on Oct. 8, 2021, now Pat. No. 11,809,413, which is a
(Continued)

(51) Int. Cl.
*G06F 16/00* (2019.01)
*G06F 16/23* (2019.01)

(52) U.S. Cl.
CPC .............................. *G06F 16/2379* (2019.01)

(58) Field of Classification Search
CPC ... G06F 16/2379; G06F 21/64; H04L 9/3239; H04L 9/3247; H04L 9/50; G06Q 10/00
See application file for complete search history.

(56) References Cited

U.S. PATENT DOCUMENTS 10,095,888 B1 * 10/2018 Lee .......................... H04L 9/14
11,057,353 B2 * 7/2021 Smith ................. H04L 63/0407
(Continued)

FOREIGN PATENT DOCUMENTS

WO    2019/021792    1/2019

OTHER PUBLICATIONS

International Search Report (ISR) issued on Jul. 14, 2020 in International (PCT) Application No. PCT/JP2020/016705.

*Primary Examiner* — Jared M Bibbee
(74) *Attorney, Agent, or Firm* — Wenderoth, Lind & Ponack, L.L.P.

(57) ABSTRACT

A control method according to the present disclosure includes: receiving, from a terminal operated by a first user who is one of parties that have concluded a first contract, first transaction data that includes a first smart contract corresponding to the first contract and a first electronic signature associated with the first user; executing a consensus algorithm with a plurality of other servers; and recording a block including the first transaction data in a distributed ledger. The first smart contract includes (i) content of the first contract which is a main contract, (ii) a variable that is provisional and used for identifying a second smart contract corresponding to a second contract which is to be newly concluded as a sub contract of the first contract, and (iii) a condition for creation of the second smart contract.

9 Claims, 17 Drawing Sheets

Related U.S. Application Data continuation of application No. PCT/JP2020/016705, filed on Apr. 16, 2020.

(60) Provisional application No. 62/834,728, filed on Apr. 16, 2019.

(56) References Cited

U.S. PATENT DOCUMENTS

| | | | |
|---|---|---|---|
| 11,250,439 B2* | 2/2022 | Leidner | G06Q 20/10 |
| 2019/0043048 A1* | 2/2019 | Wright | G06Q 20/10 |
| 2019/0327083 A1* | 10/2019 | De Filippi | G06F 21/70 |
| 2020/0151715 A1 | 5/2020 | Sato et al. | |
| 2020/0167503 A1* | 5/2020 | Wei | G06F 21/602 |
| 2021/0377225 A1* | 12/2021 | Smith | H04L 63/102 |

* cited by examiner

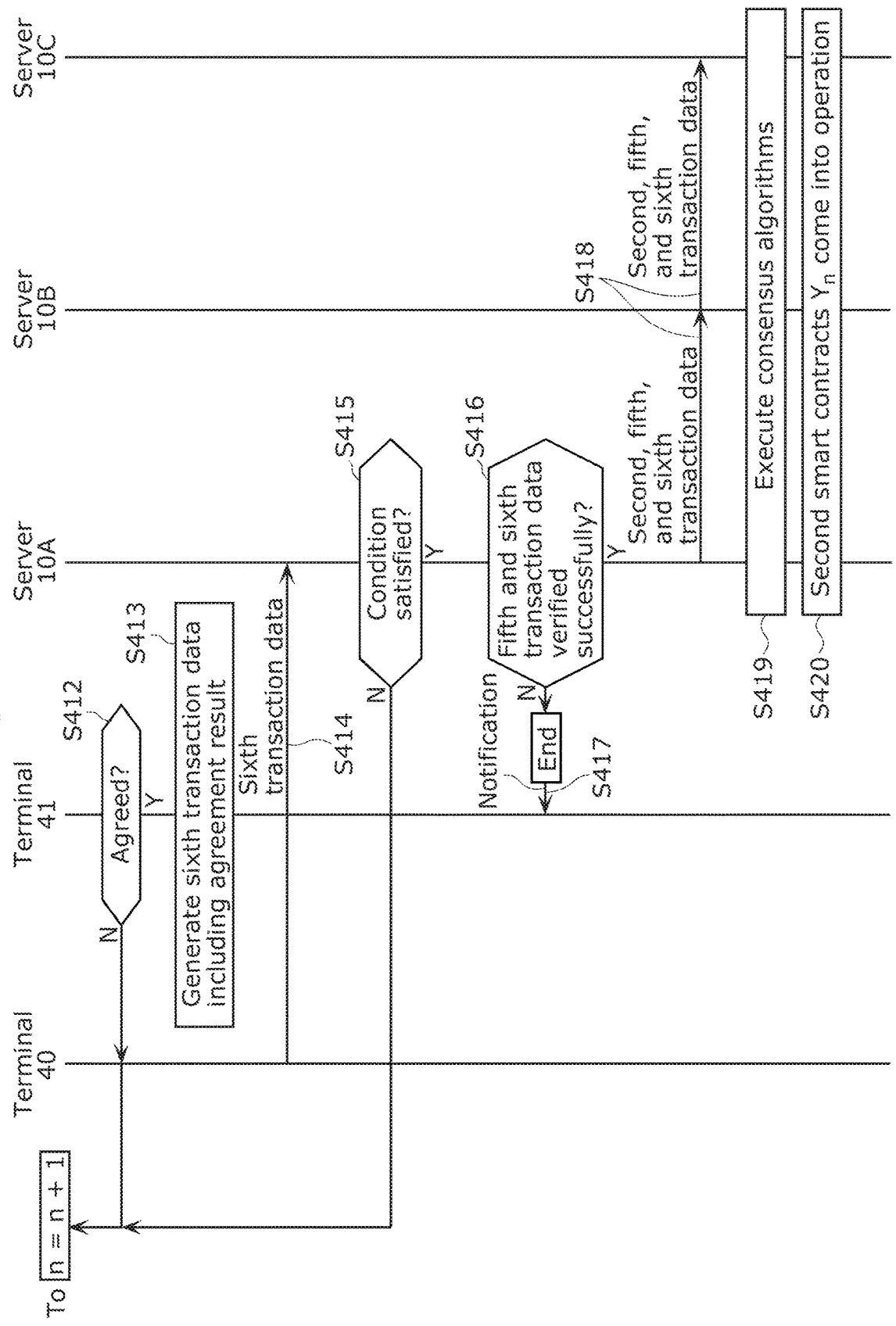

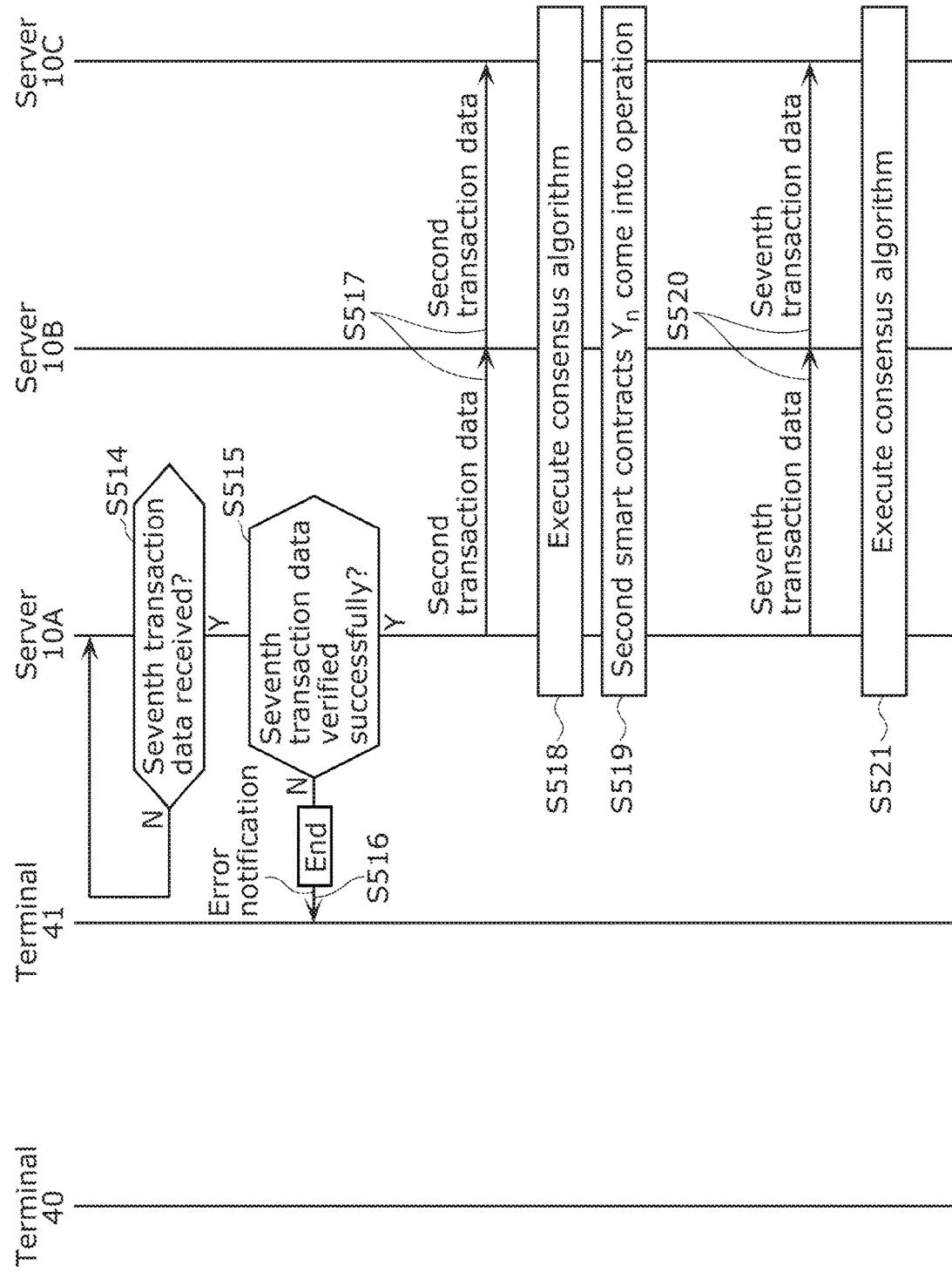

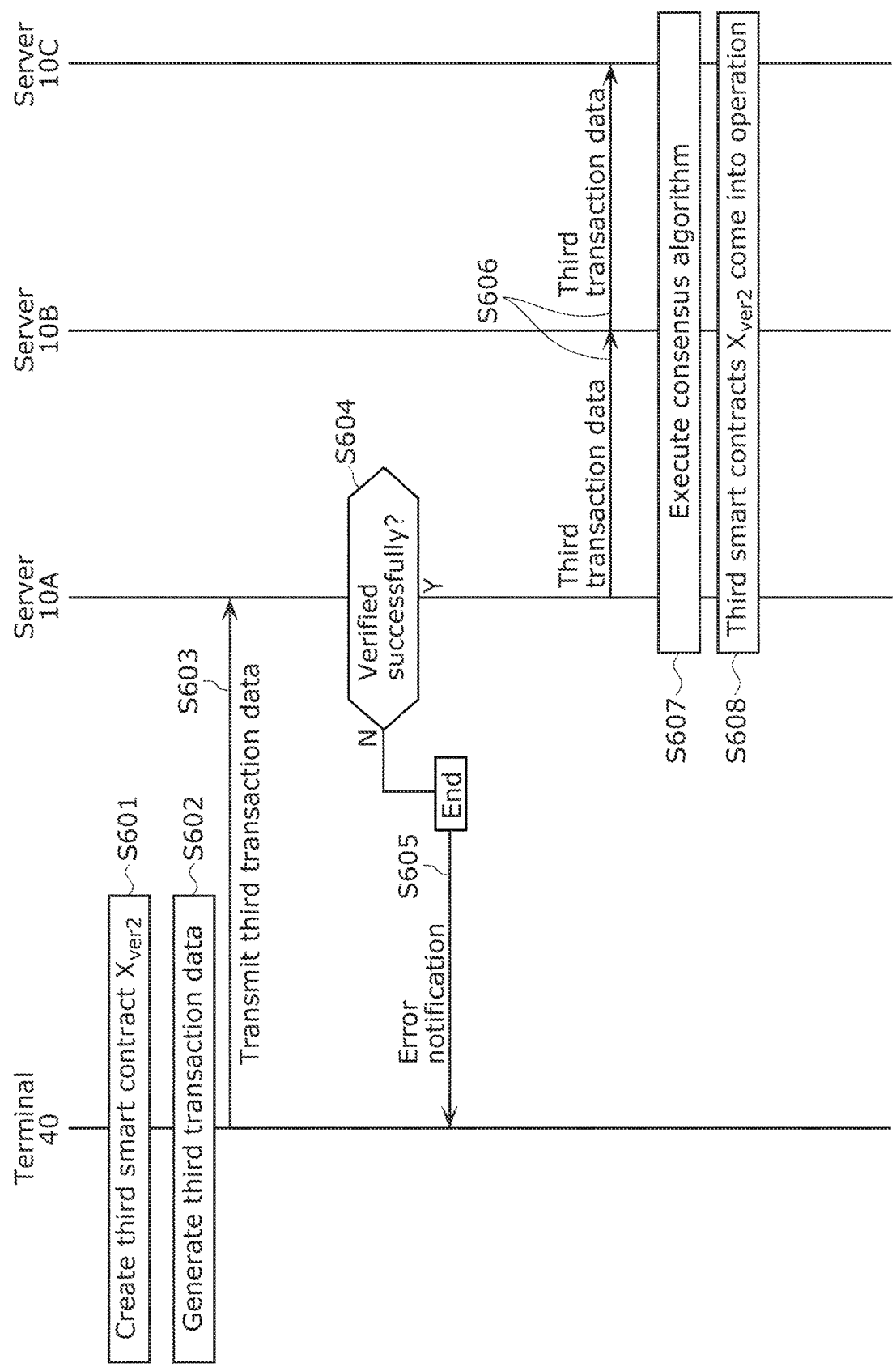

CONTROL METHOD, SERVER, AND DATA STRUCTURE

CROSS REFERENCE TO RELATED APPLICATIONS

This is a continuation of U.S. application Ser. No. 17/497,302, filed Oct. 8, 2021, which is a continuation application of PCT International Application No. PCT/JP2020/016705 filed on Apr. 16, 2020, designating the United States of America, which is based on and claims priority of U.S. Provisional Patent Application No. 62/834,728 filed on Apr. 16, 2019. The entire disclosures of the above-identified applications, including the specifications, drawings and claims are incorporated herein by reference in their entirety.

FIELD

The present disclosure relates to a control method, a server, and a data structure.

BACKGROUND

Smart contract technology is known as a mechanism to program a contract on a blockchain. A smart contract becomes executable by being included in a block of a blockchain, for example, and by the block being recorded in a distributed ledger. Thus, with use of the smart contract, contract actions, such as check of contract conditions and performance of the contract, can be automatically executed without the contract being tampered with, given that a predetermined condition is satisfied.

For example, Patent Literature (PTL) 1 discloses a mechanism that, with use of the smart contract, enables operational management with the same policy or timing between nodes even under a situation where the distributed ledger system has two or more managers.

CITATION LIST

Patent Literature

PTL 1: International Publication No. 2019/021792

SUMMARY

Technical Problem

However, once a smart contract corresponding to a contract comes into operation, the smart contract is finalized even if additional consultation stipulated in the contract arises and a new term is concluded. That is to say, statements regarding a contract action of the new term cannot be added to the smart contract. This could lead to reduction of use of smart contracts corresponding to contracts for which additional consultation may arise in the future, which could therefore make it difficult to achieve the merits of automation of contract actions, i.e., fraud prevention and reduction in time cost and energy cost that is achieved by not having to have an intermediator.

The present disclosure has been conceived in view of the above circumstances, and provides a control method and the like capable of further reducing time cost and energy cost using a distributed ledger.

Solution to Problem

A control method according to an aspect of the present disclosure is a control method performed in a system that includes a terminal operated by a user and a plurality of servers that each manage a distributed ledger and manage a smart contract using the distributed ledger, the control method being performed by a first server included in the plurality of servers, the control method including: receiving, from a first terminal operated by a first user who is one of parties that have concluded a first contract, first transaction data that includes a first smart contract corresponding to the first contract and a first electronic signature associated with the first user, the first smart contract being programmed to make a contract action of the first contract executable using the distributed ledger; and recording a block including the first transaction data in the distributed ledger, wherein the first smart contract includes (i) content of the first contract which is a main contract, (ii) a variable that is provisional and used for identifying a second smart contract corresponding to a second contract which is to be newly concluded as a sub contract of the first contract, and (iii) a condition for creation of the second smart contract.

These general or specific aspects may be implemented using a system, a method, an integrated circuit, a computer program, or a computer-readable recording medium such as a compact disc-read only memory (CD-ROM), or any combination of systems, methods, integrated circuits, computer programs, or computer-readable recording media.

Advantageous Effects

The control method and the like of the present disclosure are capable of further reducing time cost and energy cost using a distributed ledger.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 12B is a sequence diagram for explaining processing up to when the second smart contracts come into operation according to Variation 2 of the embodiment.

FIG. 13B is a sequence diagram for explaining processing up to when the second smart contracts come into operation according to Variation 3 of the embodiment.

FIG. 14 is a sequence diagram for explaining processing up to when a third smart contracts come into operation according to Variation 4 of the embodiment.

DESCRIPTION OF EMBODIMENT

Figure 1:
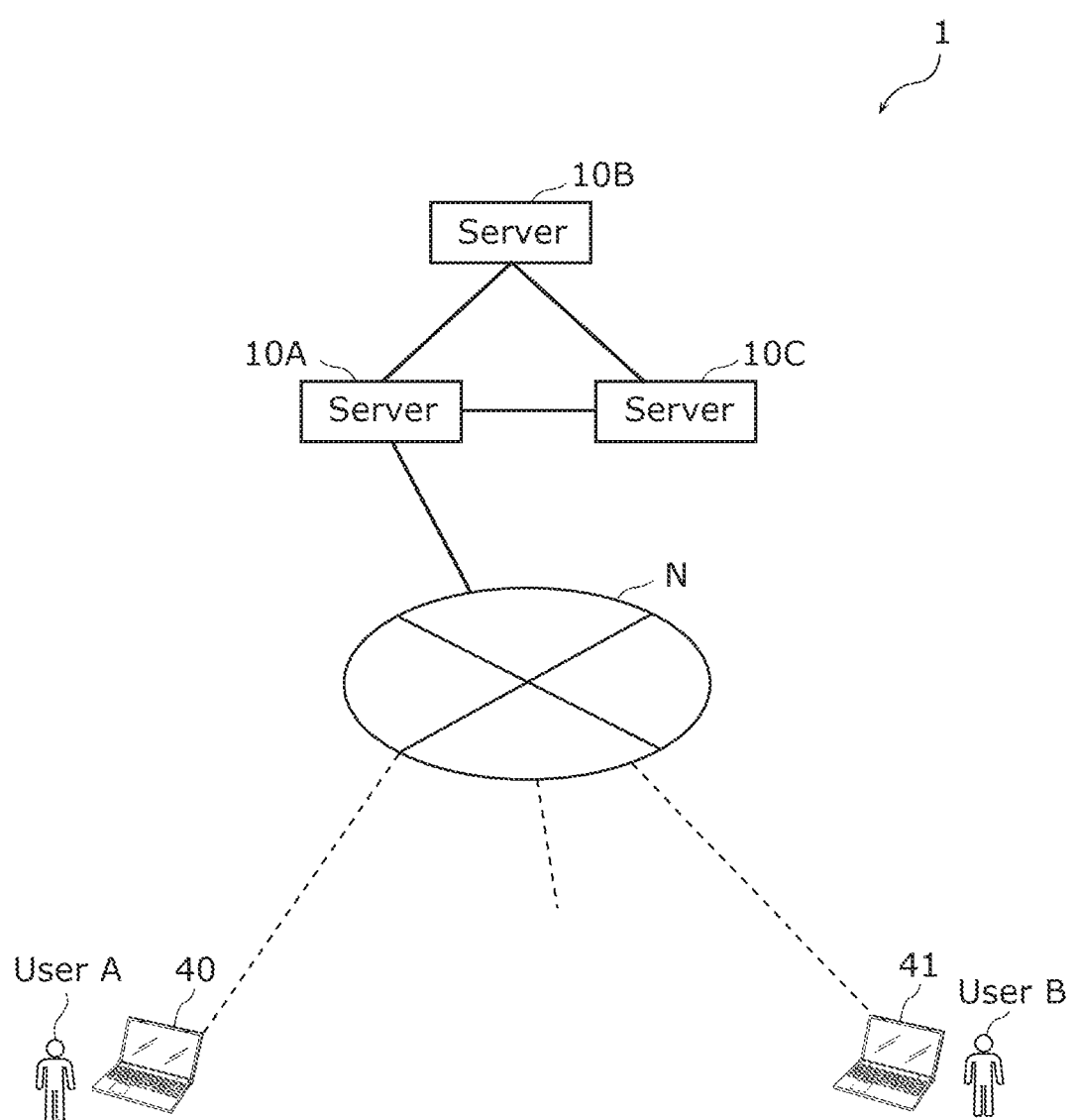
FIG. 1 is a block diagram schematically illustrating a configuration of a control system according to an embodiment.

A control method according to an aspect of the present disclosure is a control method performed in a system that includes a terminal operated by a user and a plurality of servers that each manage a distributed ledger and manage a smart contract using the distributed ledger, the control method being performed by a first server included in the plurality of servers, the control method including: receiving, from a first terminal operated by a first user who is one of parties that have concluded a first contract, first transaction data that includes a first smart contract corresponding to the first contract and a first electronic signature associated with the first user, the first smart contract being programmed to make a contract action of the first contract executable using the distributed ledger; and recording a block including the first transaction data in the distributed ledger, wherein the first smart contract includes (i) content of the first contract which is a main contract, (ii) a variable that is provisional and used for identifying a second smart contract corresponding to a second contract which is to be newly concluded as a sub contract of the first contract, and (iii) a condition for creation of the second smart contract.

This makes it possible to implement a control method and the like that are capable of further reducing time cost and energy cost using a distributed ledger.

More specifically, a variable is included in the first smart contract corresponding to the first contract for which additional consultation may arise in the future. Here, the variable is included as a substitute for the contract address of the second smart contract corresponding to the second contract which could be concluded as a result of additional consultation stipulated in the first contract. In such a manner, it is possible to express, using the first smart contract, additional consultation which may arise in the future. Accordingly, use of a smart contract corresponding to a contract for which additional consultation may arise in the future is promoted, and it is possible to achieve the merits of automation of contract actions, i.e., fraud prevention and reduction in time cost and energy cost that is achieved by not having to have an intermediator.

Here, for example, the recording of the block including the first transaction data in the distributed ledger includes: executing a first consensus algorithm with a plurality of second servers included in the plurality of servers excluding the first server, to reach a consensus on validity of the first transaction data; and recording the block including the first transaction data in the distributed ledger when the consensus on the validity of the first transaction data is reached through the first consensus algorithm.

For example, the control method includes: receiving, from the first terminal, second transaction data that includes the second smart contract corresponding to the second contract and a second electronic signature associated with the first user, the second smart contract being programmed to make a contract action of the second contract executable using the distributed ledger; and recording a block including the second transaction data in the distributed ledger, wherein the second smart contract includes at least (i) content of the second contract and (ii) an association destination of the second smart contract, the association destination being information indicating a first contract address of the first smart contract.

Here, for example, the recording of the block including the second transaction data in the distributed ledger includes: executing a second consensus algorithm with a plurality of second servers included in the plurality of servers excluding the first server, to reach a consensus on validity of the second transaction data; and recording the block including the second transaction data in the distributed ledger when the consensus on the validity of the second transaction data is reached through the second consensus algorithm.

For example, the control method further includes: identifying the condition included in the first smart contract by referring to the first contract address when the second transaction data is received; and executing the second consensus algorithm when the second transaction data is received and the condition is satisfied.

For example, the second smart contract includes the variable in addition to the content of the second contract and the first contract address.

The control method further includes: identifying the first smart contract by referring to the first contract address included in the second transaction data when the block including the second transaction data is recorded in the distributed ledger; obtaining the content of the first contract, the variable, and the condition from the first smart contract identified, and creating a third smart contract corresponding to the first contract, the third smart contract including the content of the first contract, the condition, and, instead of the variable, a second contract address included in the second transaction data; generating third transaction data including the third smart contract created and a third electronic signature associated with the first server; and recording a block including the third transaction data in the distributed ledger.

The recording of the block including the third transaction data in the distributed ledger includes: executing a third consensus algorithm with a plurality of second servers included in the plurality of servers excluding the first server, to reach a consensus on validity of the third transaction data; and recording the block including the third transaction data in the distributed ledger when the consensus on the validity of the third transaction data is reached through the third consensus algorithm.

The control method further includes causing working memory of the first server to hold information indicating that a latest smart contract corresponding to the first contract is the third smart contract.

A server according to an aspect of the present disclosure is a server in a system that includes a terminal operated by a user and a plurality of servers that each manage a distributed ledger and manage a smart contract using the distributed ledger, the server being included in the plurality of servers, the server including: a processor; memory that stores a program for causing the processor to perform processing; and a storage device that stores the distributed ledger in which a smart contract is stored, wherein the processor receives, from a first terminal operated by a first user who is one of parties that have concluded a first contract, first transaction data that includes a first smart contract corresponding to the first contract and a first electronic signature associated with the first user, the first smart contract being programmed to make a contract action of the first contract executable using the distributed ledger, the processor records a block including the first transaction data in the distributed ledger, and the first smart contract includes (i) content of the first contract which is a main contract, (ii) a variable that is provisional and used for identifying a second smart contract corresponding to a second contract which is to be newly concluded as a sub contract of the first contract, and (iii) a condition for creation of the second smart contract.

The following describes an embodiment with reference to the drawings. Note that the following embodiment illustrates a specific example of the present disclosure. That is to say, the numerical values, shapes, materials, elements, the arrangement and connection of the elements, steps, the processing order of the steps etc. illustrated in the following embodiment are mere examples, and are not intended to limit the present disclosure. The present disclosure is specified based on the claims. Accordingly, among the elements in the following embodiment, those not recited in any of the independent claims representing the most generic concepts of the present disclosure are described as elements that are not necessarily essential to achieving an object of the present disclosure but are part of the embodiment.

Embodiment

The following describes control system 1 according to an embodiment with reference to the drawings.

[Configuration of Control System 1]

Control system 1 according to the present disclosure can incorporate, into a smart contract corresponding to a first contract stored in a distributed ledger, a mechanism that can handle future occurrence of additional consultation stipulated in the first contract. This makes it possible to promote use of a smart contract corresponding to the first contract for which additional consultation may arise in the future.

FIG. 1 is a block diagram schematically illustrating a configuration of control system 1 according to the present embodiment.

As illustrated in FIG. 1, control system 1 includes servers 10A, 10B, and 10C and terminals 40 and 41 each operated by a user. These elements are communicatively connected via network N. Network N may be any communication line or network, and includes, for example, the Internet, a carrier network of a mobile phone, and so on. Servers 10A, 10B, and 10C are also referred to as "servers 10A etc.", and terminals 40 and 41 are also referred to as "terminals 40 etc." Note that although FIG. 1 illustrates an example in which control system 1 includes three servers and two terminals, the present disclosure is not limited to this example. That is to say, control system 1 may include four or more servers, and may include three or more terminals.

[Terminals 40 Etc.]

Terminals 40 and 41 each independently operate and are operated by respective users.

Terminal 40 is operated by a first user. In the present embodiment, terminal 40 is a first terminal operated by the first user who is one of parties that have concluded a first contract, which is a contract for which additional consultation may arise in the future. Terminal 40 is, for example, a personal computer, a smartphone, a tablet, or the like. In the example illustrated in FIG. 1, terminal 40 is communicative with servers 10A etc. via network N and is used and operated by user A who is the first user.

Terminal 40 creates a smart contract according to a user operation. When the smart contract is created, terminal 40 generates transaction data including the created smart contract, and transmits the generated transaction data to servers 10A etc.

For example, terminal 40 creates, according to an operation by user A who is the first user, a first smart contract which corresponds to the first contract and is programmed to make a contract action of the first contract executable using a distributed ledger. Here, the first smart contract created includes: content of the first contract which is a main contract; a provisional variable used for identifying a second smart contract corresponding to a second contract which is to be newly concluded as a sub contract of the first contract; and a condition for creation of the second smart contract. Here, the second contract is a sub contract of the first contract that is the main contract, and is concluded through additional consultation stipulated in the first contract.

In addition, when terminal 40 receives an input of an electronic signature of user A who is the first user and an instruction to generate transaction data, terminal 40 generates first transaction data which includes the electronic signature of user A and the first smart contract created. In other words, terminal 40 generates first transaction data including the first smart contract created and a first electronic signature associated with the first user. Subsequently, terminal 40 transmits the first transaction data generated to servers 10A etc.

For example, terminal 40 creates, according to an operation by user A, a second smart contract which corresponds to the second contract concluded as a result of additional consultation and is programmed to make a contract action of the second contract executable using a distributed ledger. Here, the second smart contract created includes at least content of the second contract and an association destination of the second smart contract. The association destination of the second smart contract is information indicating a first contract address of the first smart contract. That is to say, the association destination indicating the first contract address of the first smart contract indicates that the second smart contract is associated with the first contract. Note that the second smart contract may include the above-mentioned variable in addition to the content of the second contract and the first contract address.

In addition, when terminal 40 receives an input of an electronic signature of user A who is the first user and an instruction to generate transaction data, terminal 40 generates second transaction data which includes the electronic signature of user A and the second smart contract created. In other words, terminal 40 generates second transaction data including the second smart contract created and a second electronic signature associated with the first user. Subsequently, terminal 40 transmits the second transaction data generated to server 10A or the like. Note that the first electronic signature and the second electronic signature may be the same electronic signature, or may be different electronic signatures, so long as they are associated with the first user.

Terminal 41 is operated by a second user. In the present embodiment, terminal 41 is a second terminal operated by the second user who is one of the parties that have concluded the first contract and who conducts additional consultation with the first user. Terminal 41 is, for example, a personal computer, a smartphone, a tablet, or the like. In the example illustrated in FIG. 1, terminal 41 is communicative with servers 10A etc. via network N and is used and operated by user B who is the second user.

[Servers 10A Etc.]

Servers 10A, 10B, and 10C each manage a distributed ledger and manage a smart contract using the distributed ledger.

Servers 10A, 10B, and 10C are communicatively connected via network N, and independently operate. Since servers 10A, 10B, and 10C have the same configuration, server 10A is described as a representative example. Note that another server (server 10B or 10C) may perform the processing described below.

Figure 2:
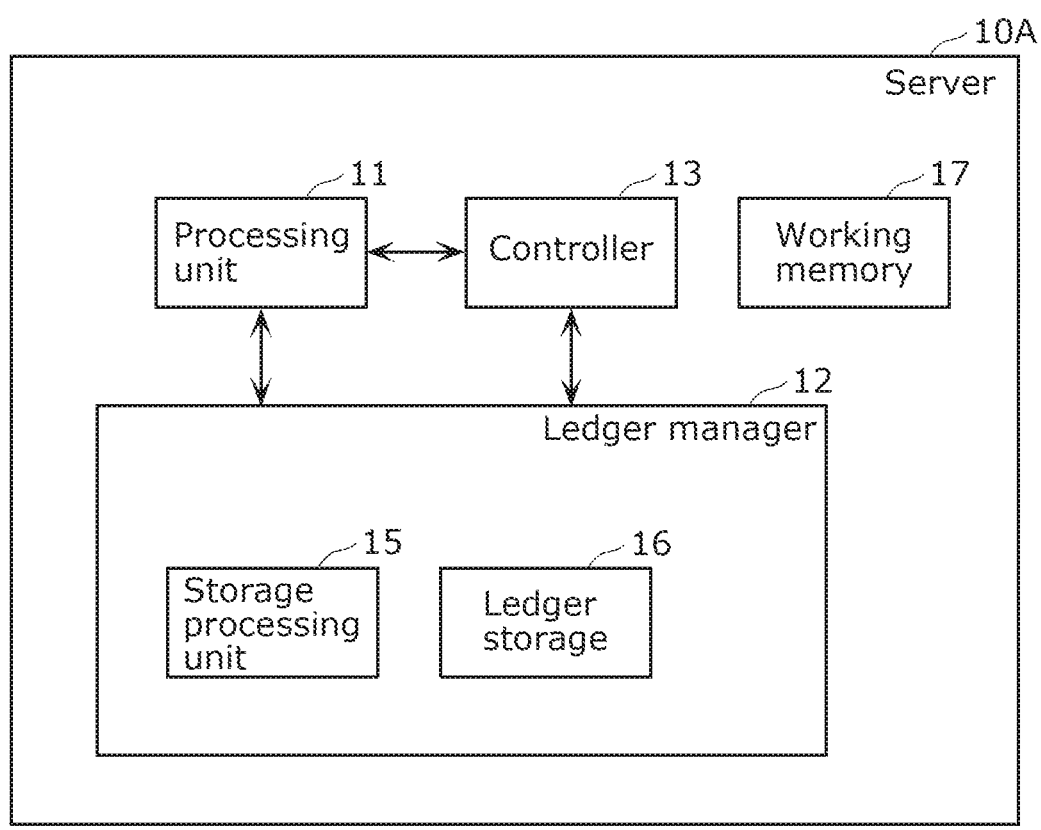
FIG. 2 is a block diagram schematically illustrating a configuration of a server according to the embodiment.

FIG. 2 is a block diagram schematically illustrating a configuration of server 10A according to the present embodiment.

Server 10A is an example of the first server. In the present embodiment, server 10A includes processing unit 11, ledger manager 12, controller 13, and working memory 17 as illustrated in FIG. 2. These functional elements included in server 10A can be implemented by, for example, a central processing unit (CPU) executing a program using memory.

<Processing Unit 11>

Processing unit 11 is a processing unit that manages various kinds of information using a distributed ledger. When processing unit 11 receives transaction data from a device in control system 1 or obtains transaction data generated by controller 13, processing unit 11 stores the received or obtained transaction data in the distributed ledger by providing the transaction data to ledger manager 12. The transaction data includes first transaction data through seventh transaction data which will be described later.

<Ledger Manager 12>

Ledger manager 12 is a processing unit that manages a distributed ledger. Specifically, when ledger manager 12 receives transaction data, ledger manager 12 transfers the received transaction data to other servers and stores the received transaction data in the distributed ledger.

As described above, ledger manager 12 stores, in the distributed ledger, the transaction data provided from processing unit 11. The distributed ledger stores transaction data from past to present. The distributed ledger is managed to prevent tampering with the above transaction data based on the property that it is difficult to tamper with information recorded in the distributed ledger.

As illustrated in FIG. 2, ledger manager 12 includes storage processing unit 15 and ledger storage 16.

Storage processing unit 15 is a processing unit that stores, in ledger storage 16, new transaction data to be stored in the distributed ledger. Storage processing unit 15 generates a block which includes new transaction data, and stores the generated block in ledger storage 16 after synchronizing the block among servers 10A etc.

More specifically, when storage processing unit 15 receives transaction data from processing unit 11, storage processing unit 15 verifies the electronic signature included in the received transaction data and the validity of the transaction data. Note that this verification may be skipped. When the electronic signature and the validity of the transaction data are verified successfully, storage processing unit 15 transfers the transaction data to other servers 10B and 10C. Next, storage processing unit 15, along with other servers 10B and 10C, executes a consensus algorithm to reach a consensus on the validity of the transaction data. Storage processing unit 15 records, in the distributed ledger, the block including the transaction data when a consensus on the validity of the transaction data is reached through the consensus algorithm.

Note that when storage processing unit 15 receives, from processing unit 11, second transaction data that includes the second smart contract corresponding to the second contract resulting from additional consultation, storage processing unit 15 identifies the condition included in the first smart contract corresponding to the first contract, which is the main contract of the second contract that is the sub contract resulting from additional consultation. In this case, storage processing unit 15 may execute a consensus algorithm when the electronic signature included in the received second transaction data and the validity of the second transaction data are verified successfully and the condition is satisfied. Note that in the case of skipping the verification of the second transaction data, storage processing unit 15 may execute a consensus algorithm when the second transaction data is received and the condition is satisfied.

In the present embodiment, storage processing unit 15 independently processes a block that includes the first smart contract corresponding to the first contract and a block that includes the second smart contract corresponding to the second contract, and stores the blocks in the distributed ledger. Also, when storage processing unit 15 receives a block that is generated by controller 13 and includes a third smart contract which is a new smart contract corresponding to the first contract, storage processing unit 15 records, in the distributed ledger, the block including the third smart contract.

Ledger storage 16 is a storage device that stores a distributed ledger. Ledger storage 16 is implemented by a hard disk drive (HDD) or a solid state drive (SSD), for example.

The distributed ledger stored in ledger storage 16 electrically records one or more items of transaction data included in a block, and is managed using the property such as a hash value, to make tampering difficult. The details will be described later. The distributed ledger stored in ledger storage 16 stores one or more smart contracts. The distributed ledger stores a program code called a contract code, for example. A smart contract may be implemented by execution of the contract code. The contract code is a code executed for performing a contract action written in the smart contract.

Note that, in the present embodiment, the distributed ledger stored in ledger storage 16 adopts, for example, a blockchain method as the blockchain implementing platform that implements distributed ledger management, but this example is not limiting. Other methods such as IOTA or Hashgraph may be adopted.

Also, although the following describes that a consensus algorithm is executed when new transaction data is stored in the distributed ledger, a consensus algorithm need not be executed.

Practical byzantine fault tolerance (PBFT) or another publicly-known consensus algorithm may be used as the consensus algorithm executed when new transaction data is stored in the distributed ledger. Examples of publicly-known consensus algorithms include proof of work (POW), proof of stake (POS), and so on. When PBFT is used as the consensus algorithm, storage processing unit 15 first receives from each of other servers 10B and 10C a report indicating whether the verification of transaction data has been successful, and determines whether the total number of reports has exceeded a predetermined number. Subsequently, storage processing unit 15 may determine that the validity of the transaction data has been verified through the consensus algorithm when the total number of reports has exceeded the predetermined number.

In the case where a consensus algorithm is not executed when new transaction data is stored in the distributed ledger, distributed ledger technology such as Hyperledger fabric may be used.

<Controller 13>

Controller 13 is a processing unit that controls various processing.

Part or all of the processing of controller 13 may be performed by performing a contract action written in a smart contract stored in ledger storage 16. Note that, as the above processing, controller 13 may implement a smart contract, that is, perform a contract action written in the smart contract, by executing a contract code stored in ledger storage 16.

Also, controller 13 creates a new smart contract which corresponds to the main contract and in which information regarding a smart contract corresponding to the sub contract concluded as a result of additional consultation on the main contract is input. Controller 13 generates transaction data that includes the new smart contract created, and transmits the transaction data to processing unit 11.

In the present embodiment, when a block including the second transaction data is recorded in the distributed ledger, controller 13 first identifies the first smart contract corresponding to the first contract by referring to the first contract address included in the second transaction data. Next, controller 13 obtains the content of the first contract, the variable, and the condition from the identified first smart contract. Next, controller 13 creates a third smart contract that corresponds to the first contract and is a new smart contract including the content of the first contract, the condition, and, instead of the variable, a second contract address included in the second transaction data. Subsequently, controller 13 generates third transaction data including the third smart contract created and a third electronic signature associated with server 10A, and transmits the third transaction data to processing unit 11.

<Working Memory 17>

Working memory 17 is memory that functions as on-memory of server 10A. Working memory 17 reads a block recorded in the distributed ledger and holds the latest smart contract corresponding to the first contract. Note that working memory 17 may hold information that specifies the latest smart contract corresponding to the first contract. For example, when the third smart contract is the latest smart contract, working memory 17 may hold information indicating that the latest smart contract corresponding to the first contract is the third smart contract.

[Data Structure]

The following describes a data structure of a blockchain and a data structure of transaction data.

Figure 3:
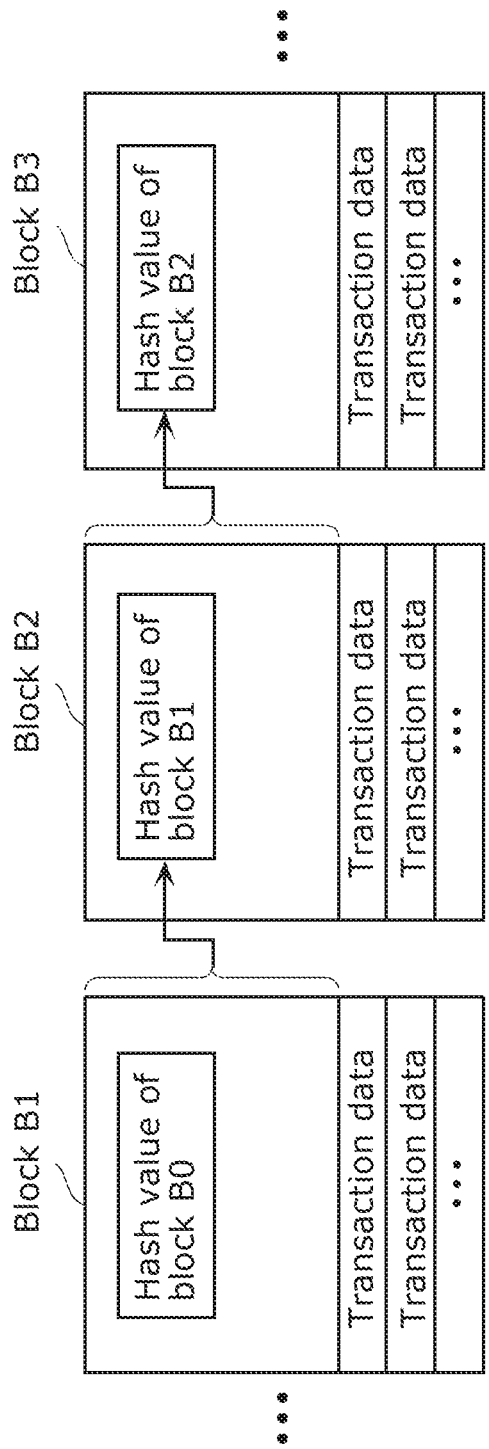
FIG. 3 is an explanatory diagram illustrating a data structure of a blockchain.

FIG. 3 is an explanatory diagram illustrating a data structure of a blockchain.

A blockchain is a chain of blocks each of which is a recording unit. Each block includes a plurality of items of transaction data and a hash value of the immediately preceding block. Specifically, block B2 includes a hash value of preceding block B1. A hash value calculated based on (i) a plurality of items of transaction data included in block B2 and (ii) the hash value of block B1 is included in block B3 as the hash value of block B2. Connecting blocks like a chain while including content of the preceding block as a hash value in such a manner effectively prevents tampering with the recorded transaction data.

If past transaction data stored in a block of the blockchain is modified, the hash value of the block changes from the hash value before the modification. To make the tampered block look genuine, all the subsequent blocks must be remade, which is very difficult in reality. With this property, the blockchain ensures difficulty in tampering.

Figure 4:
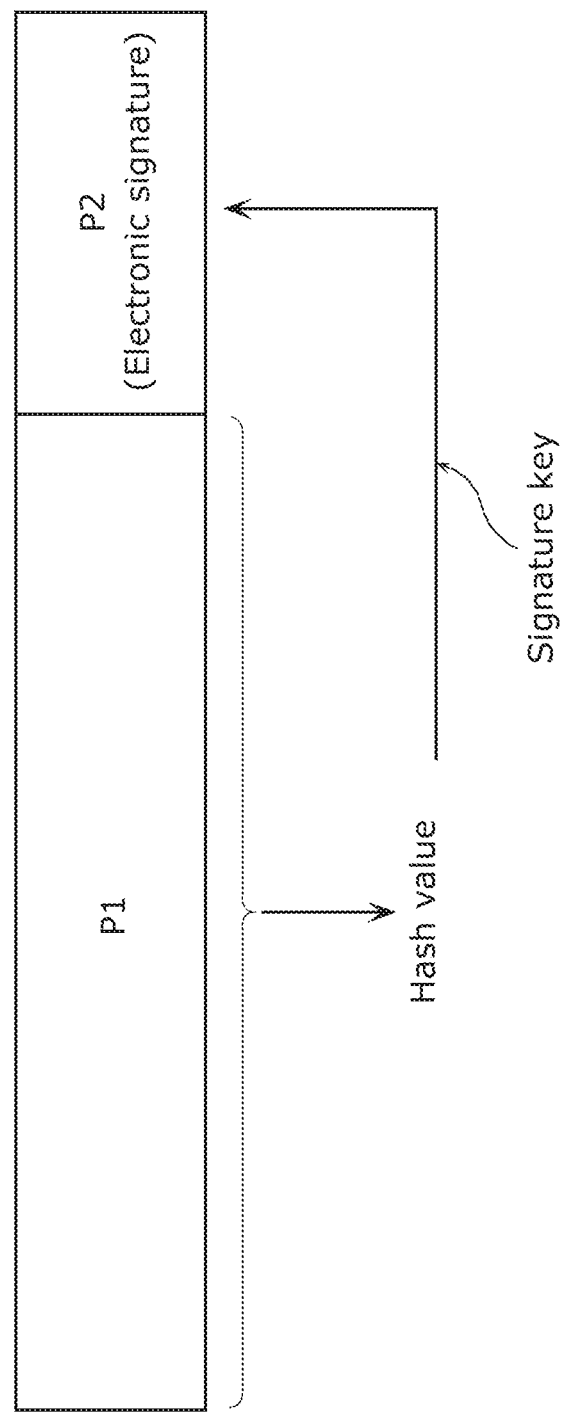
FIG. 4 is an explanatory diagram illustrating a data structure of transaction data.

FIG. 4 is an explanatory diagram illustrating a data structure of transaction data.

Transaction data illustrated in FIG. 4 includes transaction body P1 and electronic signature P2. Transaction body P1 is a data body included in the transaction data. Electronic signature P2 is generated by signing a hash value of transaction body P1 with a signature key of the creator of the transaction data, more specifically, by encrypting the hash value of transaction body P1 with a secret key of the creator.

Since the transaction data has electronic signature P2, it is substantially impossible to tamper with the transaction data. Accordingly, tampering with the transaction body is prevented.

[Operation]

The following describes, using a sequence diagram, processing up to when the first smart contract, the second smart contract, and the third smart contract come into operation in control system 1 having the above-described configuration. Hereinafter, the first smart contract is denoted as first smart contract $X_{ver1}$, the second smart contract is denoted as second smart contract $Y_n$, and the third smart contract is denoted as third smart contract $X_{ver2}$.

[Processing Up to when First Smart Contract $X_{ver1}$ Comes into Operation]

Figure 5:
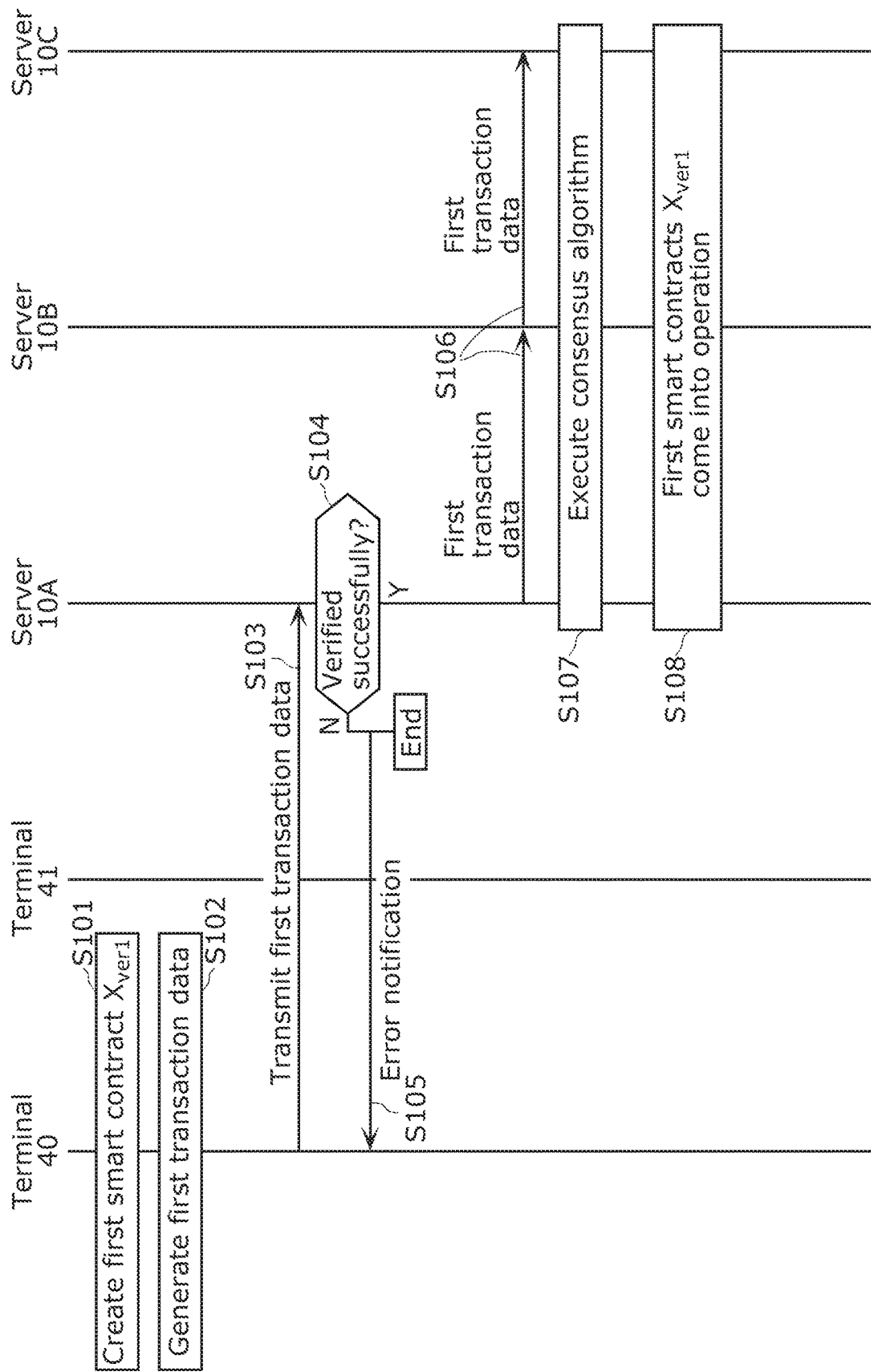
FIG. 5 is a sequence diagram for explaining processing up to when first smart contracts come into operation according to the embodiment.
Figure 6:
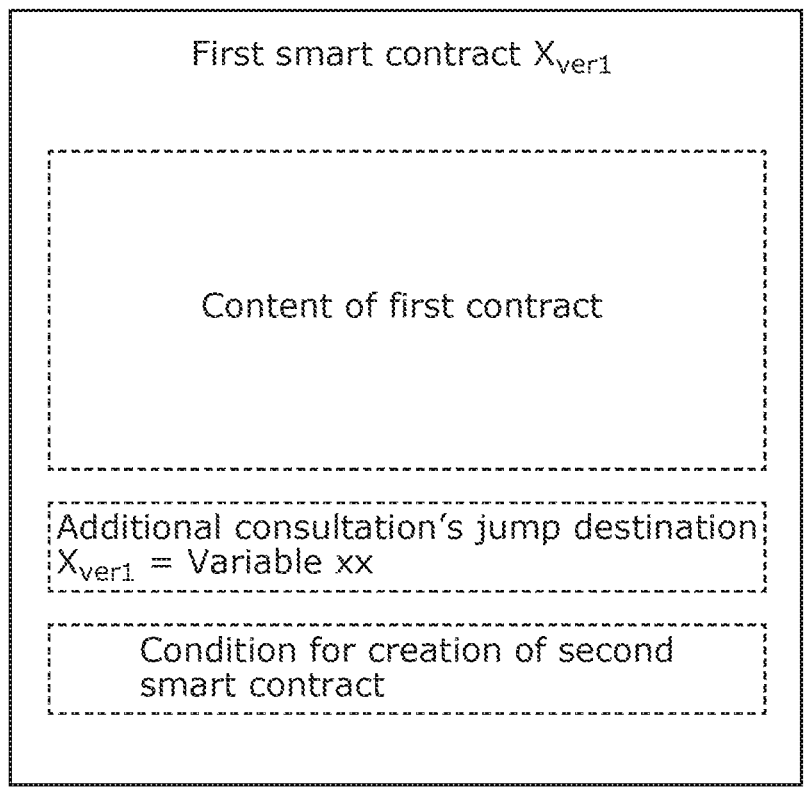
FIG. 6 is a conceptual diagram illustrating content of a first smart contract according to the embodiment.

FIG. 5 is a sequence diagram for explaining processing up to when first smart contracts $X_{ver1}$ come into operation according to the present embodiment. FIG. 6 is a conceptual diagram illustrating content of first smart contract $X_{ver1}$ according to the present embodiment.

First, terminal 40 creates first smart contract $X_{ver1}$ corresponding to the first contract according to an operation by the first user, i.e., user A who is one of the parties that have concluded the first contract for which additional consultation may arise in the future (S101). Here, first smart contract $X_{ver1}$ is a smart contract programmed to make a contract action of the first contract executable using a distributed ledger. For example, content illustrated in FIG. 6 is input in first smart contract $X_{ver1}$. That is to say, content of the first contract, a jump destination of additional consultation, and a condition for creation of the second smart contract are input in first smart contract $X_{ver1}$. The example illustrated in FIG. 6 shows, as the jump destination, a provisional variable such as "variable xx" to be used for identifying the second smart contract corresponding to the second contract. Note that variable xx need not be a provisional variable; it may be a provisional identification address, and may be a provisional value. In other words, the form of variable xx is not limited, so long as it can be used for identifying the second smart contract which will be created in the future. Note that "$X_{ver1}=$" in "jump destination $X_{ver1}=$" is provided to indicate a jump destination from the first smart contract.

Next, terminal 40 generates first transaction data that includes first smart contract $X_{ver1}$ created in step S101 and a first electronic signature associated with user A who is the first user (S102).

Next, terminal 40 transmits the first transaction data generated in step S102 to, for example, server 10A (S103). Note that terminal 40 may transmit the first transaction data generated in step S102 to server 10B or server 10C. In that case, the operation of server 10A described below will be the operation of server 10B or server 10C.

Next, server 10A verifies the first transaction data received from terminal 40 (S104). More specifically, server 10A verifies the first electronic signature included in the first transaction data received from terminal 40 and the validity of the first transaction data. Note that step S104 may be skipped.

When the first transaction data is not verified successfully in step S104 (N in S104), server 10A transmits an error notification to terminal 40 (S105), and finishes the processing.

On the other hand, when the first transaction data is verified successfully in step S104 (Y in S104), server 10A transfers the first transaction data to other servers 10B and 10C (S106). Note that when step S104 is skipped, it is sufficient so long as server 10A transfers the first transaction data received from terminal 40 to other servers 10B and 10C. Then, servers 10B and 10C each verify the first transaction data received.

Next, servers 10A, 10B, and 10C execute a consensus algorithm (S107). Here, the consensus algorithm executed in step S107 corresponds to the first consensus algorithm executed to reach a consensus on the validity of the first transaction data. When servers 10A, 10B, and 10C verify, through the execution of the consensus algorithm, that the first transaction data received is valid (i.e., verify the validity of the first transaction data), servers 10A, 10B, and 10C each generate a block including the first transaction data. Subsequently, servers 10A, 10B, and 10C record the blocks including the first transaction data in the respective distributed ledgers.

In such a manner, first smart contract $X_{ver1}$ created by terminal 40 is recorded in each distributed ledger.

Subsequently, by being recorded in the distributed ledgers, first smart contracts $X_{ver1}$ become executable, i.e., come into operation (S108). Note that first smart contracts $X_{ver1}$ recorded in the distributed ledgers may be executed when transaction data including the first contract address of first smart contract $X_{ver1}$ is received from another device or the like and recorded in the distributed ledgers.

[Processing Up to when Second Smart Contract $Y_n$ Comes into Operation]

Next, the following describes processing up to when second smart contract $Y_n$ corresponding to the second contract is created and comes into operation in the case where the second contract, which is the sub contract of the first contract that is the main contract, is concluded after conclusion of the first contract as a result of additional consultation stipulated in the first contract. In the present embodiment, the second contract is concluded as a result of additional consultation conducted between user A who is the user of terminal 40 and user B who is the user of terminal 41.

Figure 7:
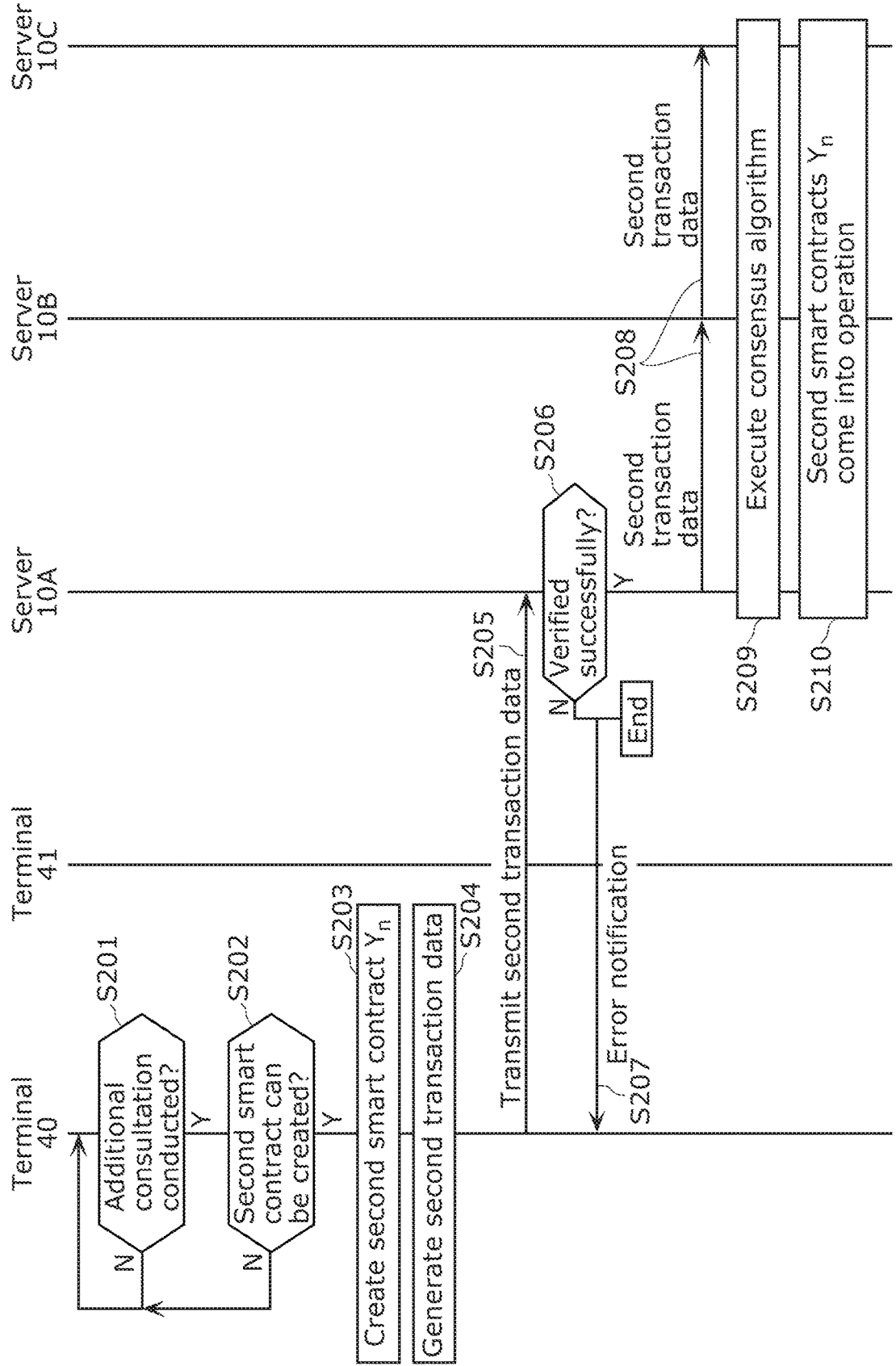
FIG. 7 is a sequence diagram for explaining processing up to when second smart contracts come into operation according to the embodiment.
Figure 8:
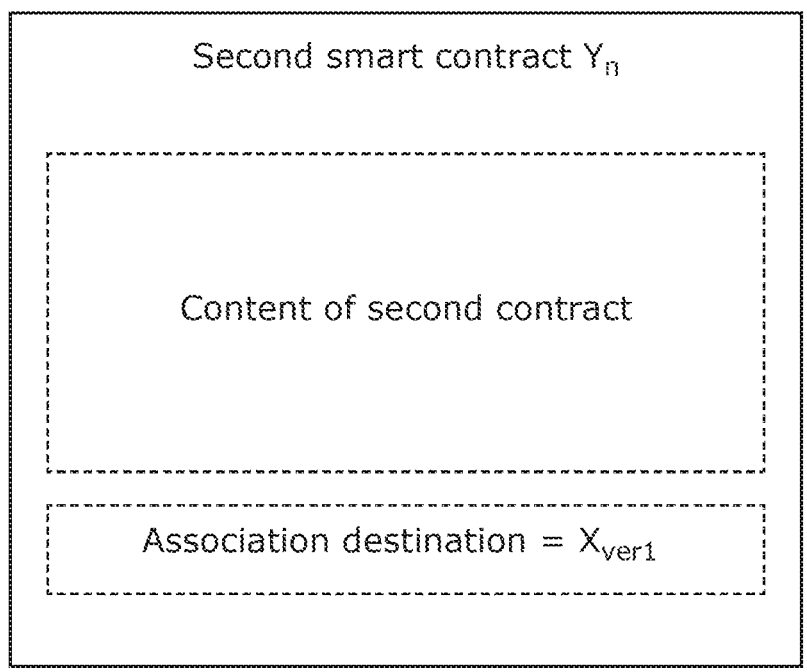
FIG. 8 is a conceptual diagram illustrating content of a second smart contract according to the embodiment.

FIG. 7 is a sequence diagram for explaining processing up to when second smart contracts $Y_n$ come into operation according to the present embodiment. FIG. 8 is a conceptual diagram illustrating content of second smart contract $Y_n$ according to the present embodiment.

First, when terminal 40 receives, through an operation by user A, an input indicating that additional consultation stipulated in the first contract has been conducted (Y in S201), terminal 40 checks whether second smart contract $Y_n$ corresponding to the second contract concluded as a result of the additional consultation can be created (S202). Terminal 40 determines that second smart contract $Y_n$ can be created when the total number of second contracts which are sub contracts of the first contract, i.e., the total number of second smart contracts $Y_n$, is a predetermined value or less. This is to provide a limit to the total number of second contracts which are sub contracts (additional contracts) of the first contract.

When terminal 40 checks in step S202 that second smart contract $Y_n$ can be created (Y in S202), terminal 40 creates second smart contract $Y_n$ corresponding to the second contract according to an operation by user A who is one of the parties that have concluded the second contract as a result of additional consultation (S203). Here, second smart contract $Y_n$ is a smart contract programmed to make a contract action of the second contract executable using a distributed ledger. For example, content illustrated in FIG. 8 is input in second smart contract $Y_n$. That is to say, content of the second contract and an association destination are input in second smart contract $Y_n$. The example in FIG. 8 shows that the association destination is first smart contract $X_{ver1}$, as indicated by "=$X_{ver1}$", for example. In the present embodiment, the first contract address of first smart contract $X_{ver1}$ is input as the association destination to indicate that the association destination is first smart contract $X_{ver1}$. In addition to the first contract address of first smart contract $X_{ver1}$, variable xx included in first smart contract $X_{ver1}$ may be input as the association destination. Note that the form of the content input as the association destination is not limited, so long as variable xx included in first smart contract $X_{ver1}$ can be identified.

Next, terminal 40 generates second transaction data that includes second smart contract $Y_n$ created in step S203 and a second electronic signature associated with user A who is the first user (S204).

Next, terminal 40 transmits the second transaction data generated in step S204 to, for example, server 10A (S205). Note that terminal 40 may transmit the second transaction data generated in step S204 to server 10B or server 10C. In that case, the operation of server 10A described below will be the operation of server 10B or server 10C.

Next, server 10A verifies the second transaction data received from terminal 40 (S206). More specifically, server 10A verifies the second electronic signature included in the second transaction data received from terminal 40 and the validity of the second transaction data. Note that step S206 may be skipped.

When the second transaction data is not verified successfully in step S206 (N in S206), server 10A transmits an error notification to terminal 40 (S207), and finishes the processing.

On the other hand, when the second transaction data is verified successfully in step S206 (Y in S206), server 10A transfers the second transaction data to other servers 10B and 10C (S208). Note that when step S206 is skipped, it is sufficient so long as server 10A transfers the second transaction data received from terminal 40 to other servers 10B and 10C. Then, servers 10B and 10C each verify the second transaction data received.

Next, servers 10A, 10B, and 10C execute a consensus algorithm (S209). Here, the consensus algorithm executed in step S209 corresponds to the second consensus algorithm executed to reach a consensus on the validity of the second transaction data. When servers 10A, 10B, and 10C verify, through the execution of the consensus algorithm, that the second transaction data received is valid (i.e., verify the validity of the second transaction data), servers 10A, 10B, and 10C each generate a block including the second transaction data. Subsequently, servers 10A, 10B, and 10C record the blocks including the second transaction data in the respective distributed ledgers.

In such a manner, second smart contract $Y_n$ created by terminal 40 is recorded in each distributed ledger.

Subsequently, by being recorded in the distributed ledgers, second smart contracts $Y_n$ become executable, i.e., come into operation (S210). Note that second smart contracts $Y_n$ recorded in the distributed ledgers may be executed when transaction data including the second contract address of second smart contract $Y_n$ is received from another device or the like and is recorded in the distributed ledgers.

[Processing Up to when Third Smart Contract $X_{ver2}$ Comes into Operation]

Next, the following describes processing up to when third smart contract $X_{ver2}$ is created and comes into operation after second smart contracts $Y_n$ come into operation. Although the present embodiment describes the case where server 10A creates third smart contract $X_{ver2}$, the same description holds true even when another server 10B or 10C creates third smart contract $X_{ver2}$.

Figure 9:
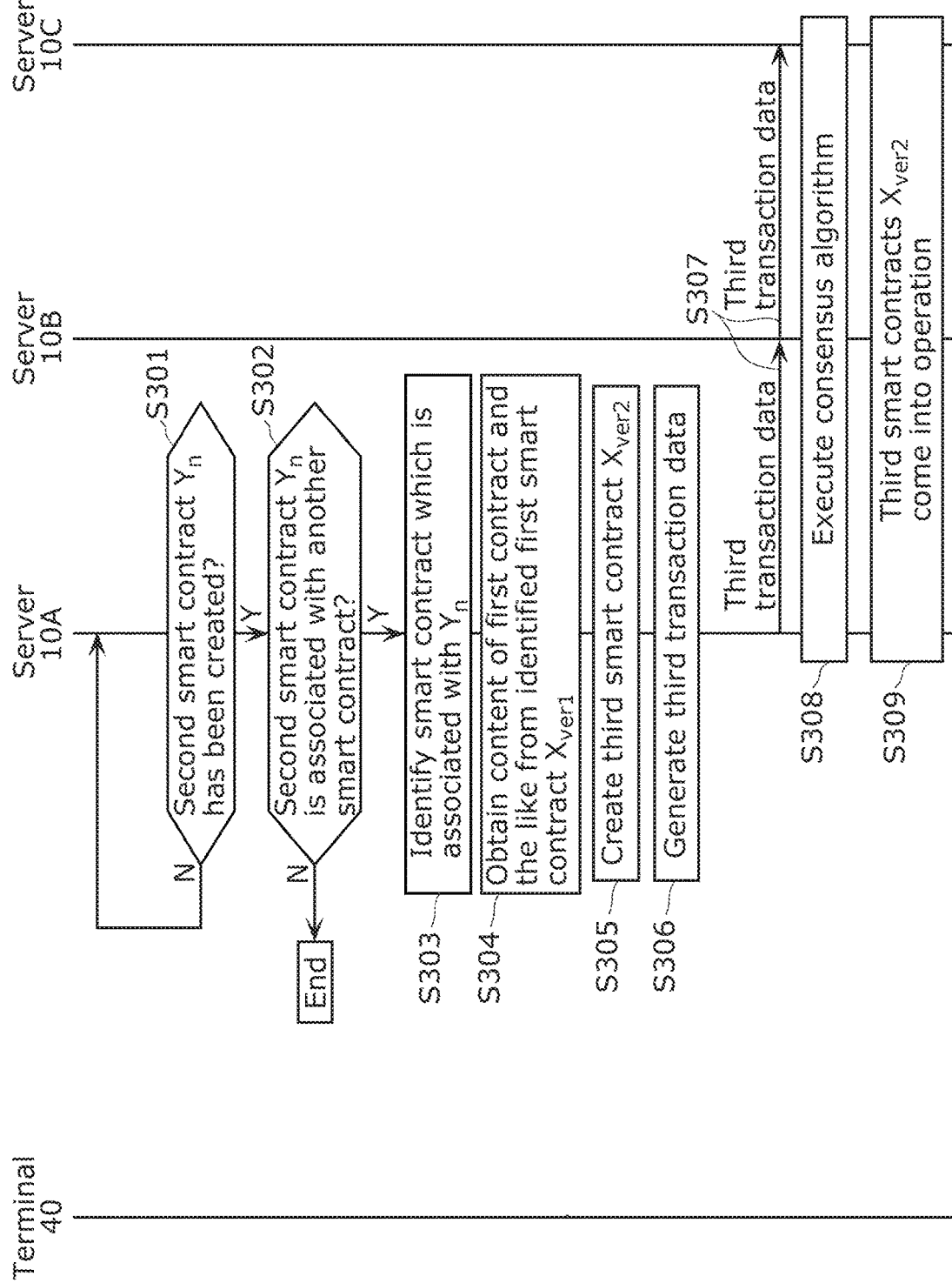
FIG. 9 is a sequence diagram for explaining processing up to when third smart contracts come into operation according to the embodiment.
Figure 10:
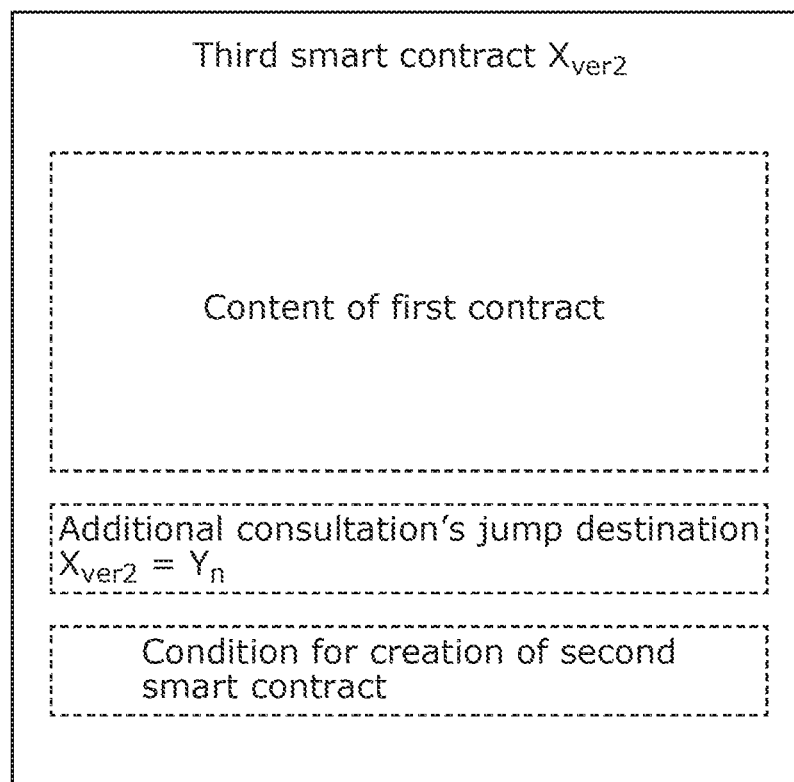
FIG. 10 is a conceptual diagram illustrating content of a third smart contract according to the embodiment.

FIG. 9 is a sequence diagram for explaining processing up to when third smart contracts $X_{ver2}$ come into operation according to the present embodiment. FIG. 10 is a conceptual diagram illustrating content of third smart contract $X_{ver2}$ according to the present embodiment.

First, when server 10A checks that second smart contract $Y_n$ has been created (Y in S301), server 10A checks whether second smart contract $Y_n$ is associated with another smart contract (S302). In the present embodiment, server 10A first checks the distributed ledger that server 10A manages, so as to check whether second smart contract $Y_n$ is recorded. Next, server 10A checks second smart contract $Y_n$ recorded in the distributed ledger, so as to check whether second smart contract $Y_n$ includes a section indicating that second smart contract $Y_n$ is associated with another smart contract.

When server 10A checks in step S302 that second smart contract $Y_n$ is associated with another smart contract (Y in S302), server 10A identifies the smart contract associated with second smart contract $Y_n$ (S303). In the present embodiment, server 10A first identifies the first contract address included in the second smart contract $Y_n$ by referring to the content of second smart contract $Y_n$ as illustrated in FIG. 8. Next, server 10A identifies first smart contract $X_{ver1}$ by referring to the identified first contract address. Note that server 10A finishes the processing when server 10A checks in S302 that second smart contract $Y_n$ is not associated with another smart contract (N in S302).

Next, server 10A obtains the content of the first contract and the like from first smart contract $X_{ver1}$ identified (S304). In the present embodiment, server 10A obtains, from first smart contract $X_{ver1}$ identified, the content of the first contract, the provisional variable used for identifying second smart contract $Y_n$, and the condition for creation of second smart contract $Y_n$.

Next, server 10A creates third smart contract $X_{ver2}$ corresponding to the first contract (S305). Here, third smart contract $X_{ver2}$ is a smart contract programmed to make contract actions of the first contract and the second contract, which has been concluded as a result of additional consultation, executable using a distributed ledger. In third smart contract $X_{ver2}$, second smart contract $Y_n$ corresponding to the second contract is expressed as the jump destination, and the contract action of the second contract becomes executable by jumping to second smart contract $Y_n$. In the present embodiment, content illustrated in FIG. 10, for example, is input in third smart contract $X_{ver2}$. That is to say, the content of the first contract, a jump destination of an additional contract, and a condition for creation of second smart contract $Y_n$ are input in third smart contract $X_{ver2}$. In the example illustrated in FIG. 10, second smart contract $Y_n$ corresponding to the second contract is shown as the jump destination of additional consultation, as indicated by "$X_{ver2}=Y_n$", for example. To indicate that the jump destination is second smart contract $Y_n$, the second contract address of second smart contract $Y_n$ is input as the jump destination. Note that the form of what is input as the jump destination of additional consultation is not limited, so long as it can be used for identifying second smart contract $Y_n$.

Next, server 10A generates third transaction data that includes third smart contract $X_{ver2}$ created in step S305 and a third electronic signature associated with server 10A (S306).

Next, server 10A transfers the third transaction data generated in step S306 to other servers 10B and 10C (S307). Then, servers 10B and 10C each verify the third transaction data received.

Next, servers 10A, 10B, and 10C execute a consensus algorithm (S308). Here, the consensus algorithm executed in step S308 corresponds to the third consensus algorithm executed to reach a consensus on the validity of the third transaction data. When servers 10A, 10B, and 10C, through the execution of the consensus algorithm, verify that the third transaction data received is valid (i.e., verify the validity of the third transaction data), servers 10A, 10B, and 10C each generate a block including the third transaction data. Subsequently, servers 10A, 10B, and 10C record the blocks including the third transaction data in the respective distributed ledgers.

In such a manner, server 10A creates third smart contract $X_{ver2}$ in which the second smart contract is input as the jump destination, and records third smart contract $X_{ver2}$ in the distributed ledger. Here, the second smart contract is a smart contract corresponding to first smart contract $X_{ver1}$ and the second contract which has been concluded as a result of additional consultation as a sub contract of the first contract which is the main contract.

Subsequently, by being recorded in the distributed ledgers, third smart contracts $X_{ver2}$ become executable, i.e., come into operation (S309). This way, the contract actions of the first contract and the second contract which has been concluded as a result of additional consultation become executable.

Advantageous Effects Etc.

As described above, according to the control method and the like of the present disclosure, a variable is included in the first smart contract corresponding to the first contract for which additional consultation may arise in the future. Here, the variable is included as a substitute for the contract address of the second smart contract corresponding to the second contract which could be concluded as a result of additional consultation stipulated in the first contract. The second smart contract is not created and the contract address of the second smart contract is not determined at the time when the first smart contract is created. Therefore, the variable is included as a substitute for the contract address of the second smart contract. This makes it possible to express, using the first smart contract, additional consultation which may arise in the future.

Assume that additional consultation has actually been conducted in connection with the first contract, and the second smart contract corresponding to the second contract concluded as a result of the additional consultation as the sub contract of the first contract which is the main contract, is created and comes into operation. In this case, according to the control method and the like of the present disclosure, the third smart contract which corresponds to the first contract and in which the second smart contract is input as the jump destination is newly created and recorded in each distributed ledger. Here, the second smart contract is a smart contract corresponding to the first smart contract and the second contract which has been concluded as a result of additional consultation.

In such a manner, since additional consultation which may arise in the future can be expressed using the first smart contract, it is possible to promote use of a smart contract corresponding to a contract for which additional consultation may arise in the future. As a result, it is possible to achieve the merits of automation of contract actions, i.e., fraud prevention and reduction in time cost and energy cost that is achieved by not having to have an intermediator.

That is to say, the control method and the like of the present disclosure are capable of further reducing time cost and energy cost using a distributed ledger.

Note that in the above embodiment, the condition for creation of the second smart contract is conclusion of the second contract as a result of additional consultation as the sub contract of the first contract which is the main contract; however, the condition is not limited this. The condition may further include obtainment of agreement from the user of terminal 41 different from terminal 40 which has created the second smart contract. The condition may further include obtainment of agreement from the user of terminal 40 which has created the second smart contract and agreement from the user of terminal 41.

In the above embodiment, the total number of second contracts concluded as the sub contracts of the first contract which is the main contract as a result of additional consultation stipulated in the first contract is one; however, the total number of second contracts is not limited to one. The total number of second contracts concluded as a result of additional consultation stipulated in the first contract may be two or more, and it is sufficient so long as a limit is set for the total number of second contracts concluded as a result of additional consultation. In this case, it is sufficient so long as server 10A creates one or more third smart contracts in which plural second smart contracts are input as the jump destinations, and records the one or more third smart contracts in each distributed ledger. Here, the plural second smart contracts are smart contracts which correspond to the first smart contract and have been concluded as a result of additional consultation.

Variation 1

In Variation 1, the condition for creation of the second smart contract includes, in addition to conclusion of the second contract as a result of additional consultation, obtainment of agreement from the user of terminal 41 different from terminal 40 which has created the second smart contract.

Figure 11A:
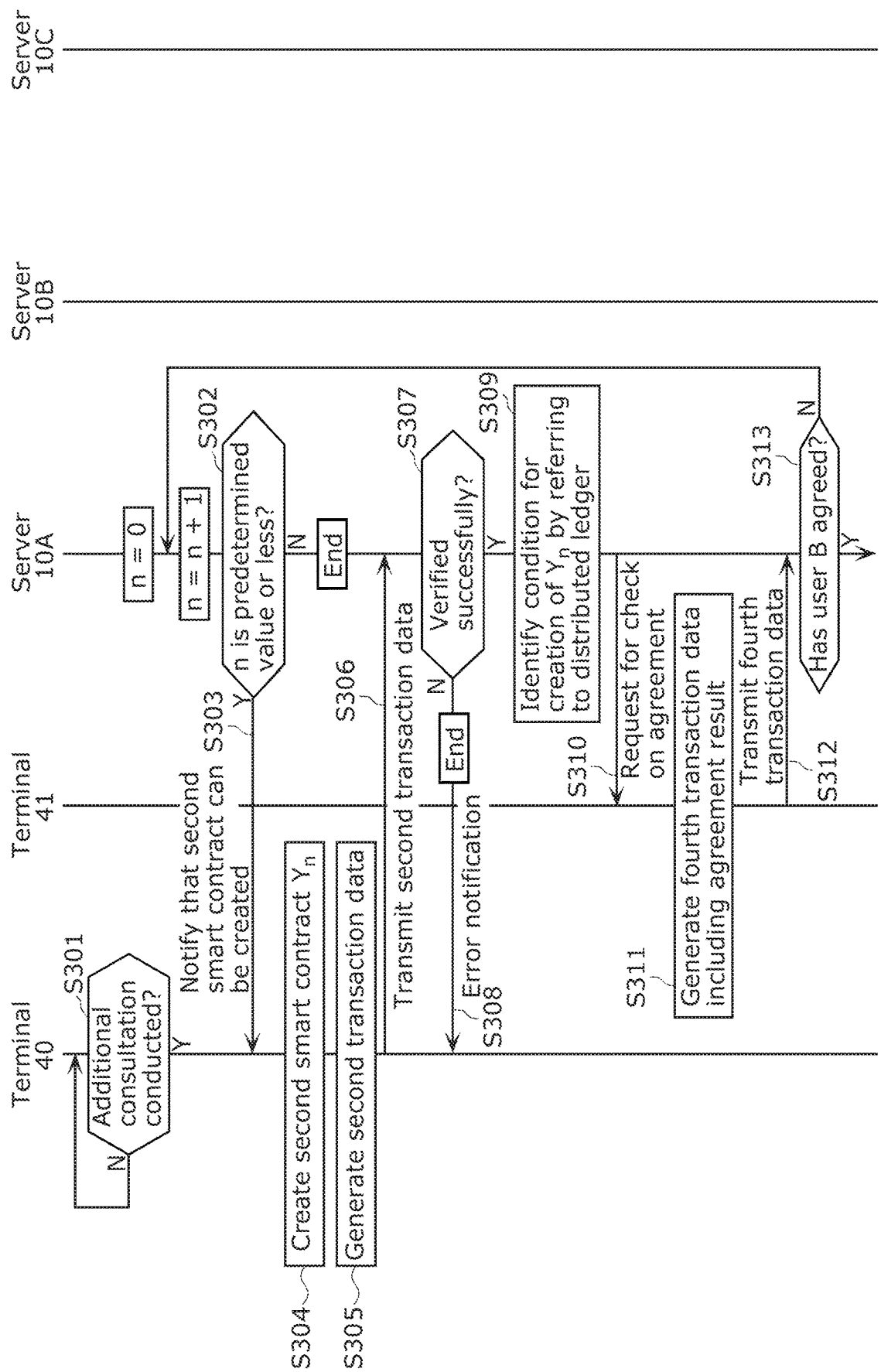
FIG. 11A is a sequence diagram for explaining processing up to when the second smart contracts come into operation according to Variation 1 of the embodiment.
Figure 11B:
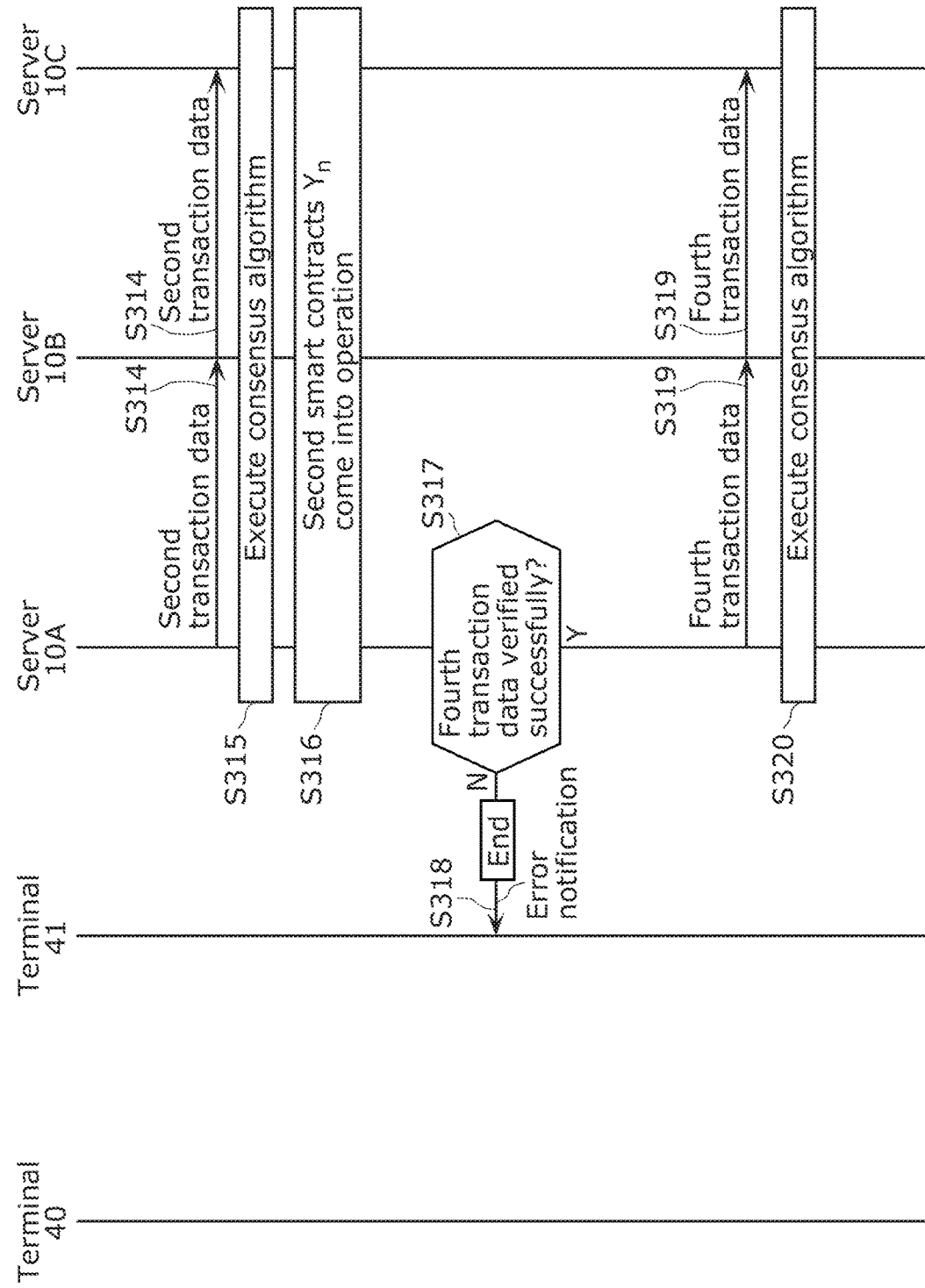
FIG. 11B is a sequence diagram for explaining processing up to when the second smart contracts come into operation according to Variation 1 of the embodiment.

FIG. 11A and FIG. 11B are sequence diagrams for explaining processing up to when second smart contracts $Y_n$ come into operation according to Variation 1 of the present embodiment. Hereinafter, too, the first smart contract is denoted as first smart contract $X_{ver1}$, and the second smart contract is denoted as second smart contract $Y_n$. Note that the content of second smart contract $Y_n$ according to the present variation is as described with reference to FIG. 8.

As compared to the sequence diagram illustrated in FIG. 7, the sequence diagram illustrated in FIG. 11A is different in that the subject that checks whether second smart contract $Y_n$ can be created is changed to server 10A, and that a request for a check on agreement is transmitted to terminal 41. As compared to the sequence diagram illustrated in FIG. 7, the sequence diagram illustrated in FIG. 11B is further different in that transaction data indicating a result of the check on agreement of user B is recorded in each distributed ledger.

In FIG. 11A, as in FIG. 7, terminal 40 first receives, through an operation by user A, an input indicating that additional consultation stipulated in the first contract has been conducted (Y in S301). In this case, terminal 40 creates second smart contract $Y_n$ corresponding to the second contract according to an operation by user A who is one of the parties that have concluded the second contract as a result of additional consultation (S304). Here, server 10A determines in step S302 whether second smart contract $Y_n$ corresponding to the second contract which could be concluded as a result of additional consultation can be created. In the present variation, terminal 40 determines that second smart contract $Y_n$ created in step S304 is an nth second smart contract created, and that n is a predetermined value or less. Therefore, server 10A determines in step S302 that second smart contract $Y_n$ can be created (Y in S302), and transmits a notification to terminal 40 indicating that second smart contract $Y_n$ can be created (S303). Note that steps S302 and S303 may be performed before step S301, or may be performed between step S301 and step S304, so long as steps S302 and 303 are performed before step S304.

Next, terminal 40 generates second transaction data that includes second smart contract $Y_n$ created in step S304 and a second electronic signature associated with user A who is the first user (S305).

Next, terminal 40 transmits the second transaction data generated in step S305 to, for example, server 10A (S306). Note that terminal 40 may transmit the second transaction data generated in step S305 to server 10B or server 10C. In that case, the operation of server 10A described below will be the operation of server 10B or server 10C.

Next, server 10A verifies the second transaction data received from terminal 40 (S307). Since processing in steps S307 and S308 are the same as the processing in steps S206 and S207 illustrated in FIG. 7, the detailed descriptions thereof are omitted.

When the second transaction data is verified successfully in step S307 (Y in S307), server 10A identifies the condition for creation of second smart contract $Y_n$ by referring to the distributed ledger of server 10A (S309). More specifically, server 10A identifies the condition that is the condition for creation of second smart contract $Y_n$ and is included in first smart contract $X_{ver1}$, by referring to first smart contract $X_{ver1}$ recorded in the distributed ledger of server 10A. In the present variation, the condition includes, in addition to conclusion of the second contract as a result of additional consultation, obtainment of agreement from the user of terminal 41 different from terminal 40 which has created second smart contract $Y_n$.

Next, in accordance with the condition identified in step S309, server 10A transmits, to terminal 41, a request for a check on agreement about second smart contract $Y_n$ created (S310).

Next, through an operation by user B who is a party to the second contract concluded as a result of additional consultation, terminal 41 receives a result of the check on agreement about second smart contract $Y_n$ created. Terminal 41 then generates fourth transaction data including the result of the check on agreement and an electronic signature associated with user B (S311).

Next, terminal 41 transmits the fourth transaction data generated in step S311 to, for example, server 10A (S312). Note that terminal 41 may transmit the fourth transaction data generated in step S311 to server 10B or server 10C. In that case, the operation of server 10A described below will be the operation of server 10B or server 10C.

Next, server 10A checks whether user B has agreed, by referring to the result of the check on agreement of user B included in the fourth transaction data received from terminal 41 (S313).

When server 10A checks in step S313 that user B did not agree (N in S313), the processing returns to S302. That is to say, in that case, server 10A does not record the fourth transaction data nor the second transaction data in the distributed ledger, and thus the processing is finished or second smart contract $Y_n$ is generated again.

On the other hand, when server 10A checks in step S313 that user B has agreed (Y in S313), server 10A transfers the second transaction data to other servers 10B and 10C (S314). Note that steps S314 through S316 are the same as steps S208 through S210 described with reference to FIG. 7, and thus the descriptions thereof are omitted.

In step S317, server 10A verifies the fourth transaction data received from terminal 41. More specifically, server 10A verifies the electronic signature included in the fourth transaction data received from terminal 41 and the validity of the fourth transaction data. Note that step S317 may be skipped.

When the fourth transaction data is not verified successfully in step S317 (N in S317), server 10A transmits an error notification to terminal 41 (S318), and finishes the processing.

On the other hand, when the fourth transaction data is verified successfully in step S317 (Y in S317), server 10A transfers the fourth transaction data to other servers 10B and 10C (S319). Note that when step S317 is skipped, it is sufficient so long as server 10A transfers the fourth transaction data received from terminal 41 to other servers 10B and 10C. Then, servers 10B and 10C each verify the fourth transaction data received.

Next, servers 10A, 10B, and 10C execute a consensus algorithm to reach a consensus on the validity of the fourth transaction data (S320). When servers 10A, 10B, and 10C verify, through the execution of the consensus algorithm, that the fourth transaction data received is valid (i.e., verify the validity of the fourth transaction data), servers 10A, 10B, and 10C each generate a block including the fourth transaction data. Subsequently, servers 10A, 10B, and 10C record the blocks including the fourth transaction data in the respective distributed ledgers.

In such a manner, second smart contract $Y_n$ created by terminal 40 and the result of the check on agreement of user B transmitted from terminal 41 are recorded in the distributed ledgers.

Variation 2

In Variation 2, the condition for creation of the second smart contract includes, in addition to conclusion of the second contract as a result of additional consultation, obtainment of (i) agreement from the user of terminal 40 which has created the second smart contract and (ii) agreement from the user of terminal 41.

Figure 12A:
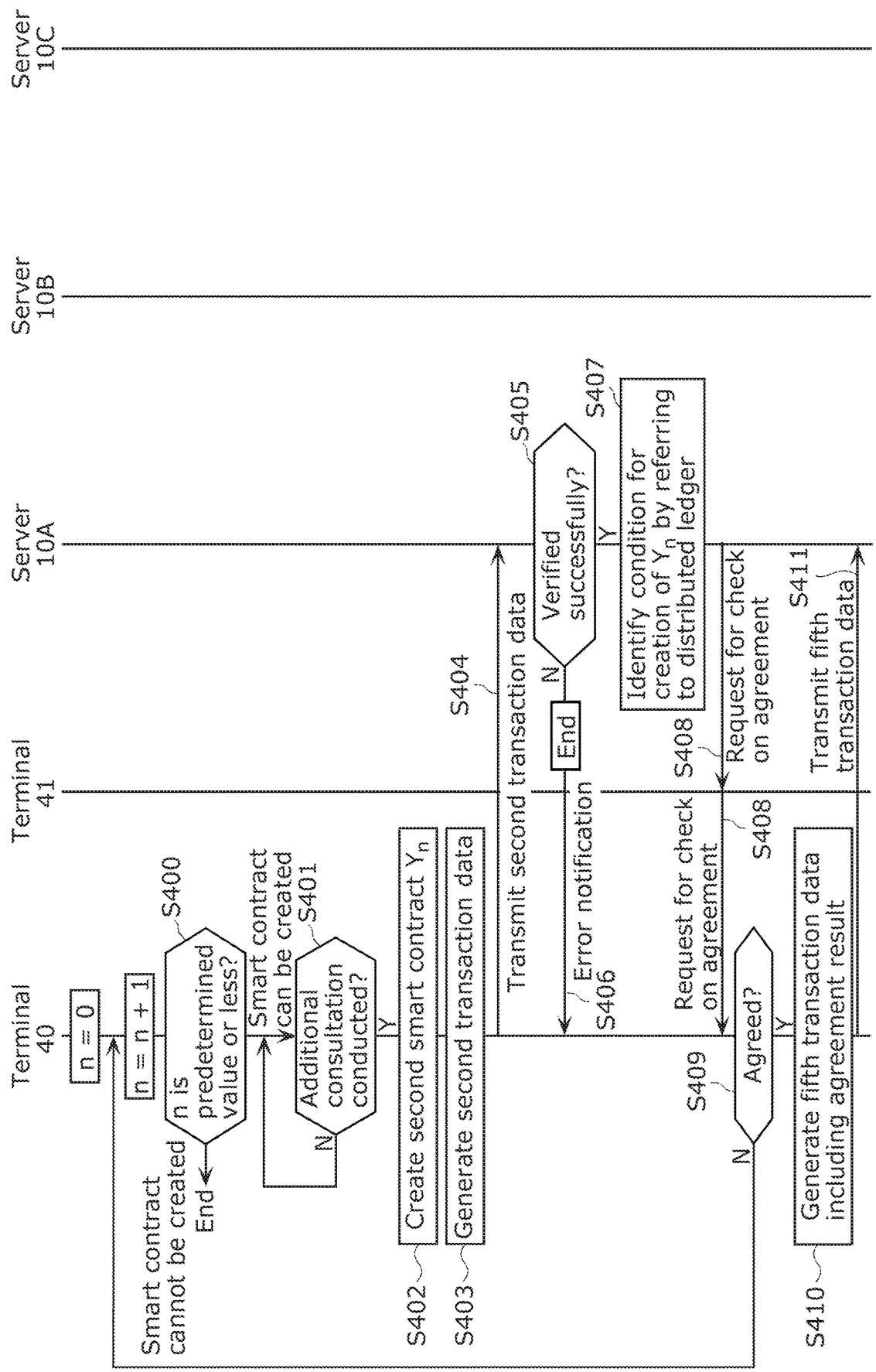
FIG. 12A is a sequence diagram for explaining processing up to when the second smart contracts come into operation according to Variation 2 of the embodiment.

FIG. 12A and FIG. 12B are sequence diagrams for explaining processing up to when second smart contracts $Y_n$ come into operation according to Variation 2 of the present embodiment. Hereinafter, too, the first smart contract is denoted as first smart contract $X_{ver1}$, and the second smart contract is denoted as second smart contract $Y_n$. Note that the content of second smart contract $Y_n$ according to the present variation is as described with reference to FIG. 8.

As compared to the sequence diagram illustrated in FIG. 11A, the sequence diagram illustrated in FIG. 12A is different in that the subject that checks whether second smart contract $Y_n$ can be created is changed from server 10A to terminal 40, and that a request for a check on agreement is transmitted to terminal 40 in addition to terminal 41. As compared to the sequence diagram illustrated in FIG. 11B, the sequence diagram illustrated in FIG. 12B is further different in that transaction data indicating a result of the check on agreement of user A is also recorded in each distributed ledger.

In FIG. 12A, terminal 40 first determines in step S400 whether a second smart contract corresponding to a second contract which could be concluded as a result of additional consultation can be created (S400). In the present variation, second smart contract $Y_n$ that terminal 40 creates next is an nth second smart contract created, and n is a predetermined value or less. Therefore, terminal 40 determines in step S400 that second smart contract $Y_n$ can be created ("smart contract can be created" in S400).

Next, when terminal 40 receives, through an operation by user A, an input indicating that additional consultation stipulated in the first contract has been conducted (Y in S401), terminal 40 creates second smart contract $Y_n$ corresponding to the second contract according to an operation by user A (S402). Note that step S400 may be performed after step S401, so long as step S400 is performed before step S402.

Next, terminal 40 generates the second transaction data (S403), and transmits the second transaction data to server 10A (S404). Note that steps S402 through S406 are the same as steps S304 through S308 described with reference to FIG. 11A, and thus the descriptions thereof are omitted.

When the second transaction data is verified successfully in step S405 (Y in S405), server 10A identifies the condition for creation of second smart contract $Y_n$ by referring to the distributed ledger of server 10A (S407). More specifically, server 10A identifies the condition that is the condition for creation of second smart contract $Y_n$ and is included in first smart contract $X_{ver1}$, by referring to first smart contract $X_{ver1}$ recorded in the distributed ledger of server 10A. In the present variation, the condition includes, in addition to conclusion of the second contract as a result of additional consultation, obtainment of (i) agreement from the user of terminal 40 which has created second smart contract $Y_n$ and (ii) agreement from the user of terminal 41 different from terminal 40.

Next, in accordance with the condition identified in step S407, server 10A transmits, to terminals 40 and 41, a request for a check on agreement about second smart contract $Y_n$ created (S408).

Next, through an operation by user A who is a party to the second contract concluded as a result of additional consultation, terminal 40 receives an agreement result about second smart contract $Y_n$ created. When an agreement result indicating that user A agrees is received (Y in S409), terminal 40 generates fifth transaction data including the agreement result and an electronic signature associated with user A (S410). Note that when an agreement result indicating that user A does not agree is received (N in S409), the processing returns to the start, i.e., step S400.

Next, terminal 40 transmits the fifth transaction data generated in step S410 to, for example, server 10A (S411). Note that terminal 40 may transmit the fifth transaction data generated in step S410 to server 10B or server 10C. In that case, the operation of server 10A described below will be the operation of server 10B or server 10C.

Next, through an operation by user B who is a party to the second contract concluded as a result of additional consultation, terminal 41 receives an agreement result about second smart contract $Y_n$ created. When an agreement result indicating that user B agrees is received (Y in S412), terminal 41 generates sixth transaction data including the agreement result and an electronic signature associated with user B (S413). Note that when an agreement result indicating that user B does not agree is received (N in S413), the processing returns to the start, i.e., step S400.

Next, terminal 41 transmits the sixth transaction data generated in step S413 to, for example, server 10A (S414). Note that terminal 41 may transmit the sixth transaction data generated in step S413 to server 10B or server 10C. In that case, the operation of server 10A described below will be the operation of server 10B or server 10C. Note that any of steps S409 and S412 may be processed first.

Next, server 10A checks whether the condition is satisfied, i.e., whether user A and user B agree, by referring to the agreement results of user A and user B included in the fifth and the sixth transaction data received from terminals 40 and 41, respectively (S415).

When server 10A checks in step S415 that user A and user B agree and the condition is satisfied (Y in S415), server 10A verifies the fifth and the sixth transaction data received from terminals 40 and 41, respectively (S416). More specifically, server 10A verifies the electronic signatures included in the fifth and the sixth transaction data received from terminals 40 and 41 and the validity of the fifth and the sixth transaction data. Note that step S416 may be skipped.

On the other hand, when server 10A checks in step S415 that user A or user B does not agree and the condition is not satisfied (N in S415), the processing returns to the start, i.e., step S400. In that case, server 10A does not record the second transaction data, the fifth transaction data, nor the sixth transaction data in the distributed ledger, and thus the processing is finished or second smart contract $Y_n$ is generated again.

When the fifth or the sixth transaction data is not verified successfully in step S416 (N in S416), server 10A transmits an error notification to terminals 40 and 41 (S417), and finishes the processing.

On the other hand, when the fifth and the sixth transaction data are verified successfully in step S416 (Y in S416), server 10A transfers the second, the fifth, and the sixth transaction data to other servers 10B and 10C (S418).

Next, servers 10A, 10B, and 10C execute consensus algorithms (S419). Here, the consensus algorithms executed in S419 are a consensus algorithm executed to reach a consensus on the validity of the second transaction data and a consensus algorithm executed to reach a consensus on the validity of the fifth and the sixth transaction data. These may be executed as independent consensus algorithms, or may be executed as one consensus algorithm.

In such a manner as described, second smart contract $Y_n$ created by terminal 40 and the agreement results of user A and user B transmitted from terminals 40 and 41 are recorded in the distributed ledgers.

Subsequently, by being recorded in the distributed ledgers, second smart contracts $Y_n$ become executable, i.e., come into operation (S420).

Variation 3

In Variation 3, the condition for creation of the second smart contract includes, in addition to conclusion of the second contract as a result of additional consultation, obtainment of agreement only from the user of terminal 41 different from terminal 40 which has created the second smart contract.

Figure 13A:
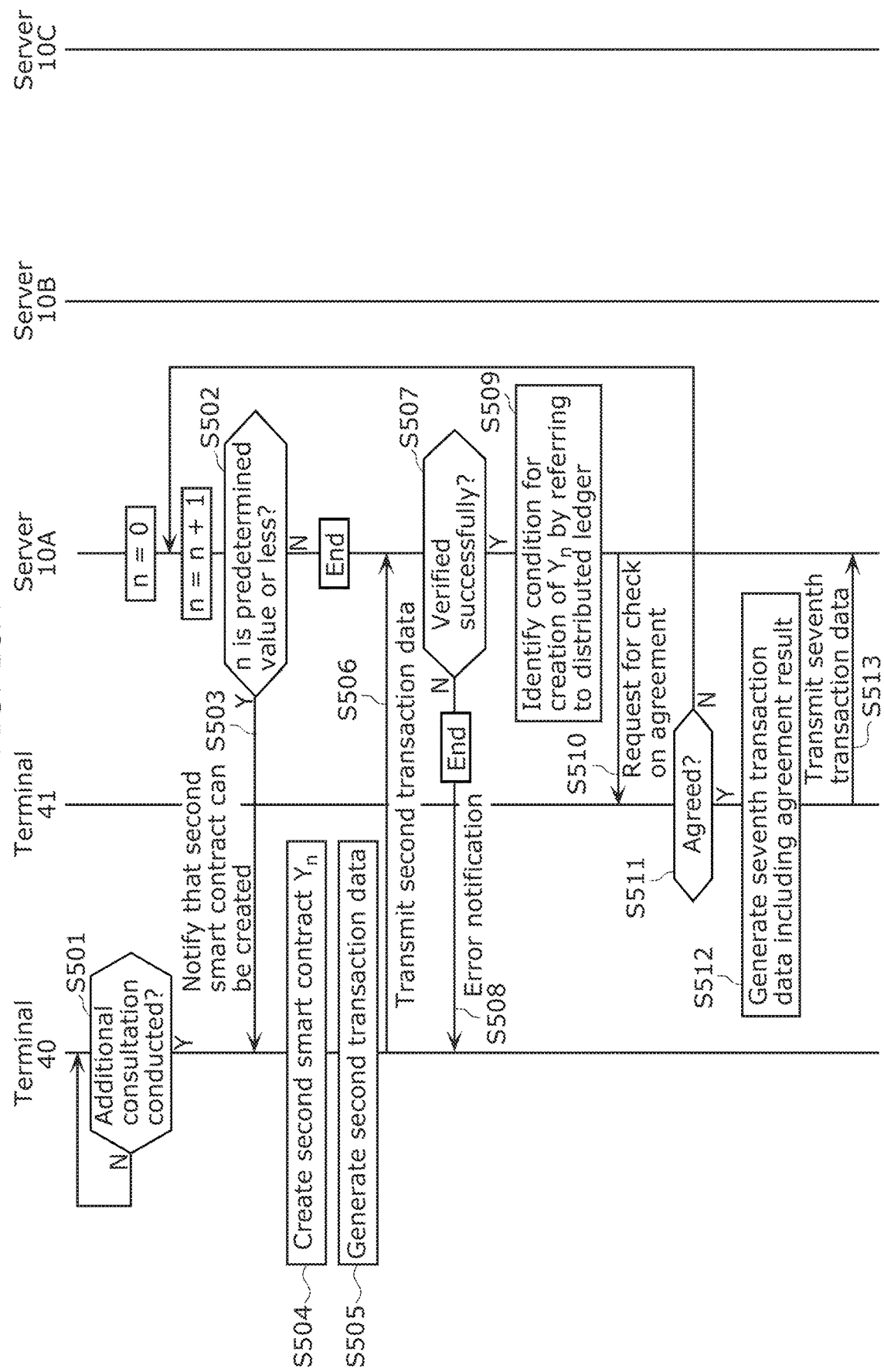
FIG. 13A is a sequence diagram for explaining processing up to when the second smart contracts come into operation according to Variation 3 of the embodiment.

FIG. 13A and FIG. 13B are sequence diagrams for explaining processing up to when second smart contracts $Y_n$ come into operation according to Variation 3 of the present embodiment. Hereinafter, too, the first smart contract is denoted as first smart contract $X_{ver1}$, and the second smart contract is denoted as second smart contract $Y_n$. Note that the content of second smart contract $Y_n$ according to the present variation is as described with reference to FIG. 8.

As compared to the sequence diagrams illustrated in FIG. 11A and FIG. 11B, the sequence diagrams illustrated in FIG. 13A and FIG. 13B are different in that a request for a check on agreement is transmitted to terminal 41, and the processing thereafter is performed only when user B of terminal 41 agrees.

Note that processing in steps S501 through S507 illustrated in FIG. 13A are the same as the processing in steps S301 through S307 illustrated in FIG. 11A, and thus the descriptions thereof are omitted. When the second transaction data is verified successfully in step S507 (Y in S507), server 10A identifies the condition for creation of second smart contract $Y_n$ by referring to the distributed ledger of server 10A (S509). More specifically, server 10A identifies the condition that is the condition for creation of second smart contract $Y_n$ and is included in first smart contract $X_{ver1}$, by referring to first smart contract $X_{ver1}$ recorded in the distributed ledger of server 10A. In the present variation, the condition includes, in addition to conclusion of the second contract as a result of additional consultation, obtainment of agreement only from the user of terminal 41 different from terminal 40 which has created the second smart contract.

Next, in accordance with the condition identified in step S509, server 10A transmits to terminal 41 a request for a check on agreement about second smart contract $Y_n$ created (S510).

Next, assume that, through an operation by user B, terminal 40 receives an agreement result about second smart contract $Y_n$ created. In that case, terminal 41 checks that user B has input an agreement result indicating that user B agrees (Y in S511), and generates seventh transaction data including the agreement result and an electronic signature associated with user B (S512).

Next, terminal 41 transmits the seventh transaction data generated in step S512 to, for example, server 10A (S513). Note that terminal 41 may transmit the seventh transaction data generated in step S512 to server 10B or server 10C. In that case, the operation of server 10A described below will be the operation of server 10B or server 10C.

Next, when server 10A receives the seventh transaction data from terminal 41 (Y in S514), server 10A verifies the seventh transaction data received from terminal 41 (S515). More specifically, when server 10A receives the seventh transaction data from terminal 41, server 10A verifies the electronic signature included in the seventh transaction data received and the validity of the seventh transaction data. Note that step S515 may be skipped.

When the seventh transaction data is not verified successfully in step S515 (N in S515), server 10A transmits an error notification to terminal 41 (S516), and finishes the processing.

On the other hand, when the seventh transaction data is verified successfully in step S515 (Y in S515), server 10A transfers the second transaction data to other servers 10B and 10C (S517). Note that when step S515 is skipped, it is sufficient so long as server 10A transfers the second transaction data received from terminal 40 and the seventh transaction data received from terminal 41 to other servers 10B and 10C. Then, servers 10B and 10C each perform verification of the second transaction data received and verification of the seventh transaction data independently.

Next, servers 10A, 10B, and 10C execute a consensus algorithm to reach a consensus on the validity of the second transaction data (S518). By being recorded in the distributed ledgers, second smart contracts $Y_n$ come into operation (S519). Note that the processing in steps S518 and S519 are the same as the processing in steps S315 and S316 illustrated in FIG. 11A, and thus the descriptions thereof are omitted.

When the seventh transaction data is verified successfully (Y in S515), server 10A also transfers the seventh transaction data to other servers 10B and 10C (S520).

Next, servers 10A, 10B, and 10C execute a consensus algorithm to reach a consensus on the validity of the seventh transaction data (S521). Note that the processing in step S521 is the same as the processing in step S320 illustrated in FIG. 11B, and thus the detailed description thereof is omitted.

In such a manner, second smart contract $Y_n$ created by terminal 40 and the seventh transaction data including the agreement result of user B transmitted from terminal 41 are recorded in each distributed ledger.

Variation 4

Although the above embodiment has described that the third smart contract is created by server 10A, the present disclosure is not limited to this. The third smart contract may be created by terminal 40 operated by user A.

Variation 4 describes the case where terminal 40 creates the third smart contract according to an operation by user A. Hereinafter, the second smart contract is denoted as second smart contract $Y_n$, and the third smart contract is denoted as third smart contract $X_{ver2}$.

FIG. 14 is a sequence diagram for explaining processing up to when third smart contracts $X_{ver2}$ come into operation according to Variation 4 of the present embodiment.

As compared to the sequence diagram illustrated in FIG. 9, the sequence diagram illustrated in FIG. 14 is different in that the subject that creates third smart contract $X_{ver2}$ is changed to terminal 40.

That is to say, terminal 40 first creates third smart contract $X_{ver2}$ corresponding to the first contract according to an operation by user A (S601). Here, user A is a party to the first contract and a party to the second contract concluded as a result of additional consultation stipulated in the first contract. Therefore, user A can easily obtain the first contract address included in second transaction data $Y_n$ created by user A. Also, user A can easily obtain, from first smart contract $X_{ver1}$, the content of the first contract, the provisional variable used for identifying second smart contract $Y_n$, and the condition for creation of second smart contract $Y_n$. That is to say, when user A creates second smart contract $Y_n$ and checks that second smart contract $Y_n$ is recorded in a distributed ledger, user A can easily cause terminal 40, through an operation by user A, to create third smart contract $X_{ver2}$. Note that, as described with reference to FIG. 10, the content of the first contract, second smart contract $Y_n$ that is the jump destination of an additional contract, and the condition for creation of second smart contract $Y_n$ are input in third smart contract $X_{ver2}$.

Next, terminal 40 generates third transaction data that includes third smart contract $X_{ver2}$ created in step S601 and the first electronic signature associated with user A who is the first user (S602).

Next, terminal 40 transmits the third transaction data generated in step S602 to, for example, server 10A (S603). Note that terminal 40 may transmit the third transaction data generated in step S602 to server 10B or server 10C. In that case, the operation of server 10A described below will be the operation of server 10B or server 10C.

Next, server 10A verifies the third transaction data received from terminal 40 (S604). More specifically, server 10A verifies the first electronic signature included in the third transaction data received from terminal 40 and the validity of the third transaction data. Note that step S604 may be skipped.

When the third transaction data is not verified successfully in step S604 (N in S604), server 10A transmits an error notification to terminal 40 (S605), and finishes the processing.

On the other hand, when the third transaction data is verified successfully in step S604 (Y in S604), server 10A transfers the third transaction data to other servers 10B and 10C (S606).

Note that the processing in step S606 and thereafter, i.e., processing in steps S606 through S608 are the same as the processing in steps S307 through S309 illustrated in FIG. 9, and thus the descriptions thereof are omitted.

In such a manner, third smart contract $X_{ver2}$ corresponding to the first contract may be created by terminal 40.

Other Embodiments Etc.

Although the present disclosure has been described based on the above embodiment, the present disclosure is not limited to the above embodiment. The present disclosure also encompasses such cases as below.

(1) For example, the present disclosure also encompasses a data structure used for blocks recorded as a blockchain in control system 1 according to the above embodiment. More specifically, a data structure according to the present disclosure is a data structure used for a block recorded in a distributed ledger in a system that includes a terminal operated by a user and a plurality of servers that each manage a distributed ledger and manage a smart contract using the distributed ledger, the data structure including: first transaction data including: a first smart contract corresponding to a first contract and obtained by being received from a first terminal operated by a first user who is one of parties that have concluded the first contract; and a first electronic signature associated with the first user, the first smart contract being programmed to make a contract action of the first contract executable using the distributed ledger, wherein the first smart contract includes (i) content of the first contract which is a main contract, (ii) a variable that is provisional and used for identifying a second smart contract corresponding to a second contract which is to be newly concluded as a sub contract of the first contract, and (iii) a condition for creation of the second smart contract.

(2) Note that the above embodiment describes the exemplary case where it is checked whether an agreement about the second smart contract corresponding to the second contract concluded as a result of additional consultation is obtained when the second smart contract is to be recorded in the distributed ledgers; however, the present disclosure is not limited to this exemplary case. Whether an agreement about the second smart contract is obtained may be checked when server 10A or terminal 40 creates the third smart contract, or may be checked when the third smart contracts come into operation.

(3) According to the present disclosure, multisig may be used to reach a consensus for recording transaction data that includes the first through third smart contracts in the distributed ledgers. Here, multisig is an abbreviation of multisignature, and is a technology which requires a plurality of secret keys for signatures included in transaction data.

(4) The above embodiment has described that the second smart contract corresponding to the second contract concluded as a result of additional consultation is associated with one first contract that is the main contract; however, the present disclosure is not limited to this. In the present disclosure, the second smart contract may be associated with a plurality of first contracts.

(5) Each device according to the above embodiment is, specifically, a computer system including a microprocessor, read-only memory (ROM), random-access memory (RAM), a hard disk unit, a display unit, a keyboard, a mouse, etc. A computer program is recorded on the RAM or the hard disk unit. Each device achieves its function as a result of the microprocessor operating according to the computer program. Here, the computer program is configured by combining a plurality of instruction codes indicating instructions for the computer in order to achieve a given function.

(6) Part or all of the elements of each device according to the above embodiment may be configured from one system LSI (large-scale integration) circuit. A system LSI circuit is a super-multifunction LSI circuit manufactured with a plurality of components integrated on a single chip, and is specifically a computer system including a microprocessor, ROM, and RAM, for example. A computer program is recorded in the RAM. The system LSI achieves its function as a result of the microprocessor operating according to the computer program.

Each element of each device described above may be implemented in a single chip individually, or in a single chip that includes some or all of them.

The name used here is system LSI circuit, but it may also be called IC, LSI circuit, super LSI circuit, or ultra LSI circuit depending on the degree of integration. Moreover, the method of circuit integration is not limited to LSI. Circuit integration may by implemented with a specialized circuit or a general purpose processor. It is also acceptable to use a field programmable gate array (FPGA) that is programmable after an LSI circuit is manufactured or a reconfigurable processor that allows reconfiguration of the connections and settings of the inner circuit cells of an LSI circuit.

Furthermore, when advancement in semiconductor technology or a derivative of other technologies brings forth a circuit integration technology which replaces LSI, it will be appreciated that such a circuit integration technology may be used to integrate the functional blocks. Application of biotechnology is one such possibility.

(7) A portion or all of the elements of each device described above may each be configured as an IC card that is detachably attached to each device, or as a stand-alone module. The IC card and the module are computer systems including a microprocessor, ROM, and RAM, for example. The IC card and the module may include the super-multifunction LSI circuit described above. The IC card and the module achieve their function as a result of the microprocessor operating according to a computer program. The IC card and the module may be tamperproof.

(8) The present disclosure may be implemented as the methods described above. The present disclosure may be a computer program implementing these methods using a computer, or a digital signal including the computer program.

Furthermore, the present disclosure may also be implemented as the computer program or the digital signal recorded on a computer-readable recording medium such as a flexible disk, hard disk, CD-ROM, magneto-optical (MO) disc, digital versatile disc (DVD), DVD-ROM, DVD-RAM, a Blu-ray Disc (BD), or a semiconductor memory, for example. The present disclosure may also be implemented as the digital signal recorded on these recording media.

Moreover, the present disclosure may also be implemented by transmitting the computer program or the digital signal via, for example, an electric communication line, a wireless or wired communication line, a network such as the Internet, or data broadcasting.

Moreover, the present disclosure may be implemented as a computer system including (i) memory having the computer program recorded therein, and (ii) a microprocessor that operates according to the computer program.

Moreover, the computer program or the digital signal may be implemented by an independent computer system by being recorded in the recording medium and transmitted, or by being transmitted via the network, for example.

(9) The above embodiment and variations may be combined.

INDUSTRIAL APPLICABILITY

The present disclosure can be used for a control method, a server, and a data structure. For example, the present disclosure can be used for a control method, a server, a data structure, and the like that, for example, record, in a distributed ledger, a smart contract corresponding to a contract for which additional consultation may arise in the future, and use the smart contract.

The invention claimed is:

1. A method comprising:
receiving second transaction data that includes a second smart contract corresponding to a second contract, the second smart contract being programmed to make a contract action of the second contract executable using a distributed ledger;
recording the second transaction data in the distributed ledger; and
recording, in the distributed ledger, third transaction data that includes a third smart contract corresponding to a first contract, the third smart contract being programmed to make a contract action of the first contract executable using the distributed ledger,
wherein the contract action of the second contract becomes executable as the third smart contract which has been recorded in the distributed ledger and has come into operation refers to the second smart contract.

2. The method according to claim 1,
wherein when the third smart contract comes into operation, the contract action of the second contract becomes executable by jumping to the second smart contract.

3. The method according to claim 2,
wherein the third smart contract includes a second contract address of the second smart contract corresponding to the second contract as a jump destination of the third smart contract.

4. The method according to claim 1,
wherein the second contract is a sub contract of the first contract which is a main contract.

5. The method according to claim 1, further comprising:
identifying a first smart contract by referring to a first contract address included in the second smart contract when the second transaction data is recorded in the distributed ledger; and
creating the third smart contract including information regarding the second smart contract and content of the first contract obtained from the first smart contract identified.

6. The method according to claim 1, further comprising:
receiving first transaction data that includes a first smart contract corresponding to the first contract, the first smart contract being programmed to make the contract action of the first contract executable using the distributed ledger; and
recording the first transaction data in the distributed ledger,
wherein the first smart contract includes (i) content of the first contract which is a main contract, (ii) a variable that is provisional and used for identifying the second smart contract corresponding to the second contract which is to be newly concluded as a sub contract of the first contract, and (iii) a condition for creation of the second smart contract.

7. The method according to claim 6,
wherein the second smart contract includes at least (i) content of the second contract and (ii) an association destination of the second smart contract, the association destination being information indicating a first contract address of the first smart contract.

8. A device comprising:
a processor; and
memory,
wherein, using the memory, the processor:
receives second transaction data that includes a second smart contract corresponding to a second contract, the second smart contract being programmed to make a contract action of the second contract executable using a distributed ledger;
records the second transaction data in the distributed ledger; and
records, in the distributed ledger, third transaction data that includes a third smart contract corresponding to a first contract, the third smart contract being programmed to make a contract action of the first contract executable using the distributed ledger,
wherein the contract action of the second contract becomes executable as the third smart contract which has been recorded in the distributed ledger and has come into operation refers to the second smart contract.

9. A non-transitory computer-readable recording medium having recorded thereon a program for causing a computer to execute the method according to claim 1.

* * * * *